(12) United States Patent
Liu et al.

(10) Patent No.: US 12,187,545 B2
(45) Date of Patent: Jan. 7, 2025

(54) SAND CONVEYING APPARATUS AND CONTROL METHOD THEREOF, CONTROL DEVICE, AND STORAGE MEDIUM

(71) Applicant: YANTAI JEREH PETROLEUM EQUIPMENT & TECHNOLOGIES CO., LTD., Shandong (CN)

(72) Inventors: Kaishen Liu, Shandong (CN); Dawei Zhao, Shandong (CN); Zhuqing Mao, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 879 days.

(21) Appl. No.: 17/336,619

(22) Filed: Jun. 2, 2021

(65) Prior Publication Data
US 2022/0315347 A1  Oct. 6, 2022

(30) Foreign Application Priority Data
Apr. 2, 2021  (CN) .......................... 202110361552.5

(51) Int. Cl.
*B65G 43/00* (2006.01)
*B65G 17/20* (2006.01)
(52) U.S. Cl.
CPC ............. *B65G 43/00* (2013.01); *B65G 17/20* (2013.01); *B65G 2201/045* (2013.01)
(58) Field of Classification Search
CPC .. B65G 43/00; B65G 17/20; B65G 2201/045; B65G 2203/0283; B65G 2203/042;
(Continued)

(56) References Cited

U.S. PATENT DOCUMENTS

| 3,339,897 A | 9/1967 | Davis, Jr. |
| 4,453,829 A | 6/1984 | Althouse, III |
| (Continued) | | |

FOREIGN PATENT DOCUMENTS

| CN | 2170241 Y | 6/1994 |
| CN | 2653117 Y | 11/2004 |
| (Continued) | | |

OTHER PUBLICATIONS

CN-112279107 (Translation) (Year: 2021).*
(Continued)

*Primary Examiner* — Kyle O Logan
*Assistant Examiner* — Erin Morris
(74) *Attorney, Agent, or Firm* — Crowell & Moring LLP

(57) ABSTRACT

A sand conveying apparatus and a control method thereof, a controlling device, and a storage medium are provided. The sand conveying apparatus includes a storage device, a conveying device, and a hoisting device. The storage device is located above an area where sand needs to be input. The conveying device is connected with the storage device. The conveying device is configured to convey the sand to the storage device. The hoisting device is located above the conveying device. The hoisting device is configured to transport the sand in the sand container to the conveying device through an action of the hoist, and the hoist of the hoisting device is configured to move simultaneously along a plurality of route segments in different directions, so as to realize a linear movement between a first position where the hoist is located and a position where the hopper is located.

19 Claims, 8 Drawing Sheets

(58) Field of Classification Search
CPC ...... B65G 63/045; B65G 65/06; B65G 65/32; B65G 65/40; B65G 63/067; B65G 65/005; B65B 69/0083; B65B 69/0008; B66C 13/085; B66C 1/16; B66C 5/02

See application file for complete search history.

(56) References Cited

U.S. PATENT DOCUMENTS

| | | | |
|---|---|---|---|
| 4,460,276 | A | 7/1984 | Arribau |
| 6,193,402 | B1 | 2/2001 | Grimland |
| 9,022,120 | B2 | 5/2015 | Zamora et al. |
| 9,328,599 | B2 | 5/2016 | Pich et al. |
| 9,375,691 | B2 | 6/2016 | Stegemoeller et al. |
| 9,833,756 | B2 | 12/2017 | Stoppler |
| 2014/0069650 | A1 | 3/2014 | Stegemoeller |
| 2015/0284194 | A1* | 10/2015 | Oren ............ B65D 90/12 414/373 |
| 2016/0047184 | A1 | 2/2016 | Luharuka |
| 2016/0216171 | A1 | 7/2016 | Moakler |
| 2016/0320347 | A1 | 11/2016 | Moakler |
| 2020/0149556 | A1 | 5/2020 | Judge |

FOREIGN PATENT DOCUMENTS

| | | | | |
|---|---|---|---|---|
| CN | 202322712 | U | 7/2012 | |
| CN | 102806027 | A | 12/2012 | |
| CN | 103193160 | A | 7/2013 | |
| CN | 203066935 | U | 7/2013 | |
| CN | 103381339 | A | 11/2013 | |
| CN | 103640981 | A | 3/2014 | |
| CN | 103958039 | A | 7/2014 | |
| CN | 203899476 | U | 10/2014 | |
| CN | 104147953 | A | 11/2014 | |
| CN | 104741012 | A | 7/2015 | |
| CN | 204447897 | U | 7/2015 | |
| CN | 105251403 | A | 1/2016 | |
| CN | 105854559 | A | 8/2016 | |
| CN | 205850752 | U | 1/2017 | |
| CN | 206045899 | U | 3/2017 | |
| CN | 103628852 | B | 5/2017 | |
| CN | 106774107 | A | 5/2017 | |
| CN | 107159046 | A | 9/2017 | |
| CN | 206661107 | U | 11/2017 | |
| CN | 206735275 | U | 12/2017 | |
| CN | 206935166 | U | 1/2018 | |
| CN | 107774144 | A | 3/2018 | |
| CN | 107902427 | A | 4/2018 | |
| CN | 207169595 | U | 4/2018 | |
| CN | 207497930 | U | 6/2018 | |
| CN | 207652980 | A | 7/2018 | |
| CN | 108371894 | A | 8/2018 | |
| CN | 208086829 | U | 11/2018 | |
| CN | 107381380 | B | 12/2018 | |
| CN | 208260574 | U | 12/2018 | |
| CN | 208500947 | U | 2/2019 | |
| CN | 109399459 | A | 3/2019 | |
| CN | 109879079 | A | 6/2019 | |
| CN | 208934678 | U | 6/2019 | |
| CN | 110077965 | A | 8/2019 | |
| CN | 209476032 | U | 10/2019 | |
| CN | 110482250 | A | 11/2019 | |
| CN | 110989603 | A | 4/2020 | |
| CN | 111005710 | A | 4/2020 | |
| CN | 210655305 | U | 6/2020 | |
| CN | 111361955 | A | 7/2020 | |
| CN | 211190074 | U | 8/2020 | |
| CN | 211225549 | U | 8/2020 | |
| CN | 211384571 | U | 9/2020 | |
| CN | 211448645 | U | 9/2020 | |
| CN | 211636063 | U | 10/2020 | |
| CN | 110371856 | B | 11/2020 | |
| CN | 112279107 | A * | 1/2021 | ............ B66C 11/00 |
| CN | 112373864 | A * | 2/2021 | ............... B66C 1/14 |
| CN | 112389950 | A | 2/2021 | |
| CN | 113385091 | A | 9/2021 | |
| CN | 113428616 | A | 9/2021 | |
| DE | 102015218686 | A1 | 3/2017 | |
| JP | 2005 205407 | A | 8/2005 | |
| KR | 20140080709 | A * | 7/2014 | ............ B66C 13/40 |
| WO | WO-2021012831 | A1 * | 1/2021 | ............ G06F 16/16 |

OTHER PUBLICATIONS

CN-112373864 (Translation) (Year: 2021).*
KR-20140080709 (Translation) (Year: 2014).*
WO-2021012831 (Translation) (Year: 2021).*
Liao et al.; "Progress of researches and applications for high shear mixers"; Chemical Industry and Engineering Progress, 38(3); 2019; pp. 1160-1175.
Tai, Guang-feng et al, "Study on an Intelligent Control System of the Sand Conveyance Device for Factory Fracturing" China Academic Journal Electronic Publishing House Mining & Metallurgy, vol. 24, No. 5, Oct. 2015 (pp. 67-71).
US Office Action, Aug. 29, 2024, pp. 1-8, issued in U.S. Appl. No. 18/515,541, USPTO, Alexandria, Virginia.

\* cited by examiner

SAND CONVEYING APPARATUS AND CONTROL METHOD THEREOF, CONTROL DEVICE, AND STORAGE MEDIUM

The present application claims priority to Chinese patent application No. 202110361552.5, filed on Apr. 2, 2021, the entire present disclosure of which is incorporated herein by reference as part of the present application.

TECHNICAL FIELD

Embodiments of the present disclosure relates to a sand conveying apparatus and a control method thereof, a control device, and a storage medium.

BACKGROUND

Fracturing refers to a method for forming cracks in an oil and gas reservoirs in the process of oil or gas production under hydraulic action, which is also called a hydraulic fracturing. As an important part of the fracturing process, a fracturing proppant is mainly used for downhole support in oil fields to increase oil and gas production. The fracturing proppant in common use include quartz sand, artificial ceramsite, and so on. With the exploitation of shale gas in recent years, large-scale fracturing operation gradually becomes normal phenomenon, and the demand for proppants is also increased.

SUMMARY

At least one embodiment of the present disclosure provides a sand conveyor apparatus. The sand conveying apparatus includes a storage device, a conveying device, and a hoisting device. The storage device is located above an area where sand needs to be input, the conveying device is connected with the storage device, wherein the conveying device includes a hopper, the hopper is configured to receive the sand, and the conveying device is configured to convey the sand to the storage device. The hoisting device is located above the conveying device, wherein the hoisting device includes a hoist, the hoist is configured to hoist a sand container, the hoisting device is configured to transport the sand in the sand container to the conveying device through an action of the hoist, and the hoist of the hoisting device is configured to move simultaneously along a plurality of route segments in different directions, so as to realize a linear movement between a first position where the hoist is located and a position where the hopper is located.

For example, in the sand conveying apparatus provided by at least one embodiment of the present disclosure, the hoisting device further includes a sand unloading mechanism, and the hoist includes a hanger; the sand unloading mechanism is connected with both the hoist and an end of the sand container away from the hoist, and the hanger is configured to be connected with an end of the sand container closing to the hoist; and the sand unloading mechanism is configured to automatically unloading the sand in the sand container into the hopper of the conveying device.

For example, in the sand conveying apparatus provided by at least one embodiment of the present disclosure, the hoisting device further includes a first track parallel to a first direction and a second track parallel to a second direction, wherein the first direction and the second direction is different from each other, and the hoist of the hoisting device is configured to move simultaneously on the first track and the second track.

For example, in the sand conveying apparatus provided by at least one embodiment of the present disclosure, the hoisting device further includes at least one first motor and at least one second motor, the at least one first motor is configured to drive the hoist to move on the first track, and the at least one second motor is configured to drive the hoist to move on the second track.

For example, in the sand conveying apparatus provided by at least one embodiment of the present disclosure, a plurality of first limit sensors are provided on the first track, and a plurality of second limit sensors are provided on the second track. Positions of the first limit sensors located at two ends of the first track are first utmost positions, and positions of the second limit sensors at two ends of the second track are second utmost positions. The hoist is configured to move on the first track without exceeding the first utmost positions and to move on the second track without exceeding the second utmost positions.

For example, in the sand conveying apparatus provided by at least one embodiment of the present disclosure, the hoisting device further includes at least one third motor, and the at least one third motor is configured to drive the hanger to move in a third direction. The third direction is perpendicular to the first direction and the second direction.

For example, the sand conveying apparatus provided by at least one embodiment of the present disclosure further includes a tilt-angle sensor, the tilt-angle sensor is configured to detect a tilt angle between the hoist and the third direction during a process of moving the hoist on the first track and the second track.

For example, the sand conveying apparatus provided by at least one embodiment of the present disclosure further includes: a control system, signally connected with the storage device, the conveying device, and the hoisting device, and the control system including a first control module, wherein the first control module is in signal connection with the hoisting device; wherein the first control module includes: a transport command generation unit, configured to generate a sand transport command after the sand container is hung on the hoist, a raw-feeding route generation unit, configured to generate a raw-feeding route between the first position where the hoist is located and the position where the hopper of the conveying device is located in response to the sand transport command, wherein the first position of the hoist is located above the sand container, and the raw-feeding route includes the plurality of route segments in the different directions, and a raw-unloading control unit, configured to control the hoist to move to a position above the hopper along the raw-feeding route, and unload the sand in the sand container into the hopper, wherein during a process of moving the hoist to the position above the hopper along the raw-feeding route, the hoist moves simultaneously along the route segments of the plurality of route segments in the different directions and reaches the position above the hopper, so as to realize the linear movement of the hoist between the first position where the hoist is located and the position where the hopper is located.

For example, in the sand transport equipment provided by at least one embodiment of the present disclosure, the control system further includes a second control module, the second control module is connected with the storage device. The storage device includes a plurality of storage tanks, and each of the storage tanks is provided with a raw level detector. The raw level detector is configured to detect a storage amount of the sand in the storage tank. The second control module is configured to respond to the storage amount of the sand in the storage tank and generate a demand information corresponding to the storage tank in a case where the storage amount of the sand in the storage tank is insufficient.

For example, in the sand conveying apparatus provided by at least one embodiment of the present disclosure, the control system further includes a third control module. The third control module is connected with the conveying device and configured to control the movement of the conveying device and the conveying of the sand. The third control module is configured to generate and output the displacement route of the conveying device in response to the input demand information and the position of the hopper of the conveying device. The demand information includes a demand information corresponding to a single storage tank and a demand information corresponding to the plurality of storage tanks arranged in sequence. The third control module is further configured to control the conveying device to move to a position in correspondence to the single storage tank along the displacement route, or move to positions in correspondence to the plurality of storage tanks one by one according to the arrangement sequence of the plurality of storage tanks.

For example, in the sand conveying apparatus provided by at least one embodiment of the present disclosure, the conveying device includes a belt assembly, and the third control module is further configured to control, after uploading the sand in the sand container into the hopper, in a case where the conveying device is in a non-moving state, the belt assembly to convey the sand in the hopper of the conveying device to the storage tank corresponding to the conveying device.

For example, in the sand conveying apparatus provided by at least one embodiment of the present disclosure, the third control module further includes a proximity switch. The proximity switch is provided at the feed inlet of each of the plurality of storage tanks. In a case where the conveying device moves to reach the feed inlet of the storage tank, the proximity switch outputs a proximity signal. The third control module is configured to determine that the conveying device corresponds to the storage tank according to the proximity signal.

For example, in the sand conveying apparatus provided by at least one embodiment of the present disclosure, a sand feeding shutter is provided at the feed inlet of the storage tank, and an opening sensor is provided on the sand feeding shutter. The opening sensor is configured to detect an opening value of the sand feeding shutter. The second control module is configured, in a case where the conveying device corresponds to the storage tank, to output a tank opening information of the storage tank. The third control module is configured to control the sand feeding shutter at the feed inlet of the storage tank to open in response to the tank opening information and to control the belt assembly to run in a case where the opening value of the sand feeding shutter is greater than a preset value.

At least one embodiment of the present disclosure further provides a control method of the sand conveying apparatus according to any one described above. The control method includes: generating a sand transport command, after the sand container is hung on the hoist of the hoisting device; generating a raw-feeding route between the first position where the hoist is located and the position where the hopper of the conveying device is located in response to the sand transport command, wherein the first position of the hoist is located above the sand container, and the raw-feeding route includes the plurality of route segments in the different directions; and controlling the hoist to move to the position above the hopper along the raw-feeding route, and uploading the sand in the sand container into the hopper, wherein controlling the hoist to move to the position above the hopper along the raw-feeding route includes: controlling the hoist to move simultaneously along the route segments of the plurality of route segments in the different directions and reach the position above the hopper, so as to realize the linear movement of the hoist between the first position of the hoist and a position of the hopper.

For example, in the control method provided by at least one embodiment of the present disclosure, a coordinate system is established based on an action range of the hoisting device; according to a scale information, the positions of the hoist and the hopper are marked in the coordinate system, and the positions of the hoist and the hopper are updated in real time; and a moving range of the hoist is set in the coordinate system.

For example, in the control method provided by at least one embodiment of the present disclosure, the coordinate system includes a first coordinate axis and a second coordinate axis; each of the plurality of route segments of the raw-feeding route is parallel to the first coordinate axis or the second coordinate axis of the coordinate system, and the first coordinate axis is different from the second coordinate axis, a first track is provided in a direction parallel to the first coordinate axis, and a second track is provided in a direction parallel to the second coordinate axis; and controlling the hoist to move to the position above the hopper along the raw-feeding route includes: controlling the hoist to move on the first track and the second track simultaneously.

For example, in the control method provided by at least one embodiment of the present disclosure, a plurality of first limit sensors are provided on the first track, and a plurality of second limit sensors are provided on the second track; positions of the first limit sensors located at two ends of the first track are first utmost positions, and positions of the second limit sensors at two ends of the second track are second utmost positions; and the control method includes: controlling the hoist to move on the first track without exceeding the first utmost positions and to move on the second track without exceeding the second utmost positions.

For example, in the control method provided by at least one embodiment of the present disclosure, controlling the hoist to move on the first track without exceeding the first utmost positions and to move on the second track without exceeding the second utmost positions includes: during movement of the hoist, calculating position coordinates of the hoist in the coordinate system according to a moving time of the hoist; according to trigger signals generated by the plurality of first limit sensors and the plurality of second limit sensors during the movement of the hoist, calibrating the position coordinates of the hoist; and comparing the position coordinates of the hoist with the first utmost positions and the second utmost positions respectively, in a case where the position coordinate of the hoist exceeds the first utmost positions or the second utmost positions, stopping an operation of the hoist and activating a protection mechanism.

For example, in the control method provided by at least one embodiment of the present disclosure, after unloading the sand in the sand container into the hopper, the method further includes: controlling the hoist to return to the first position of the hoist along the raw-feeding route, so as to continue a next sand transportation.

For example, in the control method provided by at least one embodiment of the present disclosure, the hoisting device further includes a sand unloading mechanism, and the hoist includes a hanger; the sand unloading mechanism is connected with both the hoist and an end of the sand container away from the hoist, and the hanger is configured to be connected with an end of the sand container closing to the hoist; and unloading the sand in the sand container into the hopper includes: automatically unloading the sand in the sand container into the hopper through the sand unloading mechanism.

For example, in the control method provided by at least one embodiment of the present disclosure, before the sand container is hung on the hoist, in a case where the hoist is located at a second position different from the first position, a moving route is generated between the first position and the second position of the hoist; and the hoist is controlled to move to the first position along the moving route.

For example, in the control method provided by at least one embodiment of the present disclosure, the coordinate system further includes a third coordinate axis, and the third coordinate axis is perpendicular to the first coordinate axis and the second coordinate axis; after the hoist is moved to the first position, the hanger of the hoist falls along the third coordinate axis to hang the sand container; after the sand container is hung on the hanger of the hoist, the hanger of the hoist rises along the third coordinate axis, until the hanger of the hoist rises to a third utmost position in a direction of the third coordinate axis within the moving range of the coordinate system.

For example, the control method provided by at least one embodiment of the present disclosure further includes: during the movement of the hoist along the raw-feeding route, detecting a tilt angle between the hoist and the third coordinate axis by using a tilt-angle sensor; in a case where the tilt angle is greater than an warning threshold, sending an alarm information; and in a case where the tilt angle is greater than a safety threshold, stopping an operation of the hoist.

For example, in the control method provided by at least one embodiment of the present disclosure, the storage device includes a plurality of storage tanks, each of the plurality of storage tanks corresponds to one demand site in the coordinate system; and the control method includes: in a case where the demand site needs to be loaded, generating a demand information, wherein the demand information includes a single demand site or a plurality of demand sites arranged in sequence; in response to the inputted demand information and the position of the hopper, generating and outputting a displacement route of the conveying device; and controlling the conveying device to move to the single demand site along the displacement route, or move to the plurality of demand sites one by one according to the arrangement sequence of the plurality of demand sites.

For example, the control method provided by at least one embodiment of the present disclosure further includes: in a case where the conveying device moves to the single demand site, or in a case where the conveying device moves to a last one of the plurality of demand sites, outputting an arrival information and controlling the conveying device to stop moving, wherein the conveying device and the hoist do not move simultaneously.

For example, in the control method provided by at least one embodiment of the present disclosure, the conveying device includes a belt assembly, after automatically unloading the sand in the sand container into the hopper through the sand unloading mechanism, the control method includes: in a case where the conveying device is in a non-moving state, controlling the belt assembly to run, so as to convey the sand in the hopper of the conveying device into the storage tank corresponding to the conveying device, wherein in a case where there is no sand on the belt assembly, a completion information is output.

For example, in the control method provided by at least one embodiment of the present disclosure, before controlling the belt assembly to run, so as to convey the sand in the hopper of the conveying device into the storage tank corresponding to the conveying device, the control method further includes: in a case where the conveying device corresponds to the storage tank, outputting a tank opening information, wherein the tank opening information is used to open a feed inlet of the storage tank; otherwise, outputting a closing information, wherein a proximity switch is provided at the feed inlet of the storage tank, and in a case where the conveying device moves to the feed inlet of the storage tank, determining whether the conveying device corresponds to the storage tank according to a proximity signal sent by the proximity switch.

For example, in the control method provided by at least one embodiment of the present disclosure, one of the plurality of storage tanks of the storage device sends the tank opening information at a time.

For example, the control method provided by at least one embodiment of the present disclosure further includes: controlling a sand feeding shutter at the feed inlet of the storage tank to open, in response to the tank opening information; detecting an opening value of the sand feeding shutter by using an opening sensor on the sand feeding shutter; and in a case where the opening value is greater than a preset value, controlling the belt assembly to run.

At least one embodiment of the present disclosure further provides a control device, which includes: a processor and a memory, wherein a computer executable code is stored in the memory, and in a case where the computer executable code is run by the processor, the control method according to any one described above is executed.

At least one embodiment of the present disclosure further provides a computer-readable storage medium, having an executable code stored thereon, wherein in a case where the executable code is executed by a processor, the processor executes the control method according to any one described above.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

Figure 1:
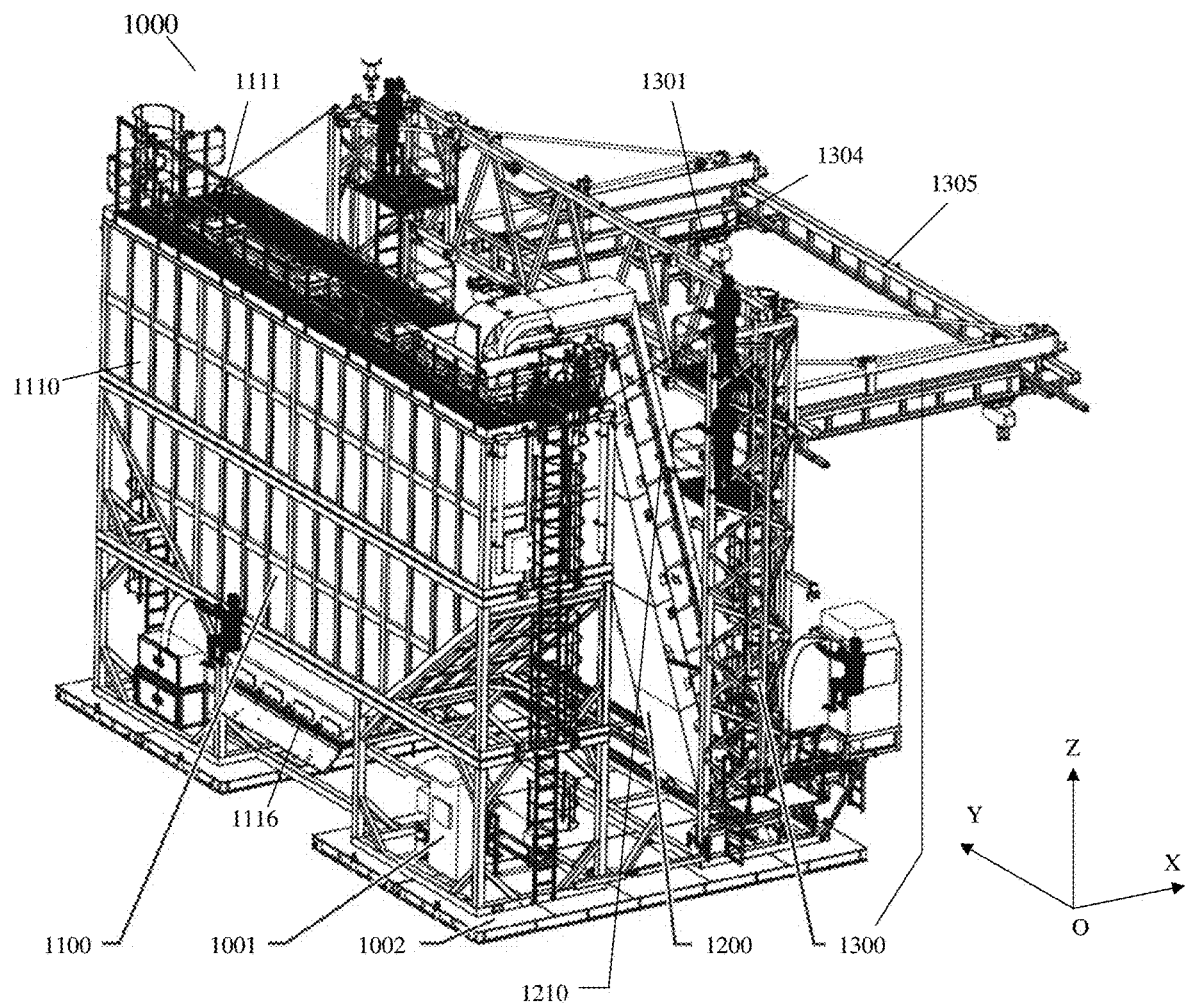
FIG. 1 is a schematically structural diagram of a sand conveying apparatus provided by at least one embodiment of the present disclosure.

In order to make objectives, technical details, and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first", "second", etc., which are used in the present disclosure, are not intended to indicate any sequence, amount or importance, but distinguish various components. Similarly, similar terms such as "a", "an", or "the", etc., do not indicate the limitation of quantity, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects.

At present, the commonly used sand conveying apparatus in fracturing well sites includes a sand tank, which needs to be hoisted by a crane during filling sand, and people need to stand on an operating platform for high-altitude operations. The sand discharging device of the sand tank is a manual valve that needs to be operated manually. Thus, the entire apparatus is arranged with no automatic operation and requires a lot of human participation. It also increases the personal danger in the process of human participation in the operation. In addition, in the case where the crane hoists, the boom directly hoists the sand tank without a strict moving route, which has poor stability and low efficiency.

At least one embodiment of the present disclosure provides a sand conveyor apparatus, the sand conveying apparatus includes a storage device, a conveying device, and a hoisting device. The storage device is located above an area where sand needs to be input. The conveying device is connected with the storage device. The conveying device includes a hopper, the hopper is configured to receive the sand, and the conveying device is configured to convey the sand to the storage device. The hoisting device is located above the conveying device. The hoisting device includes a hoist, and the hoist is configured to hoist a sand container. The hoisting device is configured to transport the sand in the sand container to the conveying device through an action of the hoist, and the hoist of the hoisting device is configured to move simultaneously along a plurality of route segments in different directions, so as to realize a linear movement between a first position where the hoist is located and a position where the hopper is located.

At least one embodiment of the present disclosure provides a control method of a sand conveyor apparatus, and the method includes: generating a sand transport command after a sand container is hung on a hoist of a hoisting device; generating a raw-feeding route between a first position where the hoist is located and a position where the hopper of the conveying device is located in response to the sand transport command; the first position of the hoist being located above the sand container, and the raw-feeding route including a plurality of route segments in different directions; controlling the hoist to move to a position above the hopper along the raw-feeding route, and unloading the sand in the sand container into the hopper; herein, the controlling the hoist to move to the position above the hopper along the raw-feeding route includes: controlling the hoist to move simultaneously along the route segments of the plurality of route segments in different directions and reach the position above the hopper, so as to realize a linear movement of the hoist between the first position of the hoist and the position of the hopper.

The sand conveying apparatus and the control method of the sand conveying apparatus provided by the above-mentioned embodiments of the present disclosure realize simultaneous movement of the hoist in different directions, that is, realize the linear movement of the hoist between the first position and the position of the hopper, thereby improving the stability and efficiency of the hoist and increasing the accuracy of controlling the hoist.

The embodiments and examples of the present disclosure will be described in detail below with reference to the accompanying drawings.

FIG. 1 is a schematically structural diagram of a sand conveying apparatus provided by at least one embodiment of the present disclosure.

For example, in some embodiments, as shown in FIG. 1, the sand conveying apparatus 1000 includes a storage device 1100, a conveying device 1200, and a hoisting device 1300. The storage device 1100 is located above the area where the sand needs to be input, and is configured to output the sand. The storage device 1100 includes a plurality of storage tanks 1110. For example, the storage device 1100, as shown in the drawing, includes four storage tanks 1110. Each of the plurality of storage device 1100 has an inverted cone shape. A feed inlet 1111 corresponding to each of the plurality of storage tanks 1110 is provided above the storage device 1100. A feed outlet 1116 corresponding to each of the plurality of storage tanks 1110 is provided below the storage device 1100. The area corresponding to the feed outlet 1116 is the area where the sand needs to be input. For example, the area where the sand needs to be input is a wellhead for oil or gas production. The storage device 1100 outputs the sand by opening the feed outlets.

It should be noted that the embodiments of the present disclosure are not limited to the shape of the storage device 1100 and the number of the plurality of storage tanks 1110.

Figure 3:
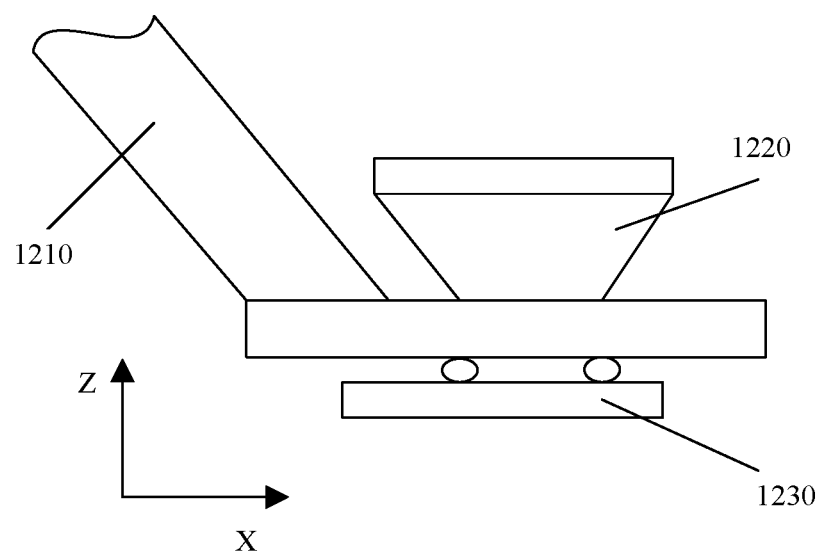
FIG. 3 is a schematically partial structural diagram of a conveying device provided by at least one embodiment of the present disclosure.

FIG. 3 is a partially structural diagram of the conveying device provided by at least one embodiment of the present disclosure.

As shown in FIG. 1 and FIG. 3, the conveying device 1200 is connected with the storage device 1100. The conveying device 1200 includes a hopper 1220 (as shown in FIG. 3). The hopper 1220 is configured to receive the sand (for example, the sand delivered by a hoisting device), and the conveying device 1220 is configured to convey the sand to the storage device 1100. For example, the conveying device 1200 includes a belt assembly 1210. The belt assembly 1210 is connected with the feed inlet 1111 of a storage tank 1110 and the hopper 1220, and the conveying device 1200 conveys the sand in the hopper 1220 to the storage device 1100 through the belt assembly 1210.

Figure 4A:
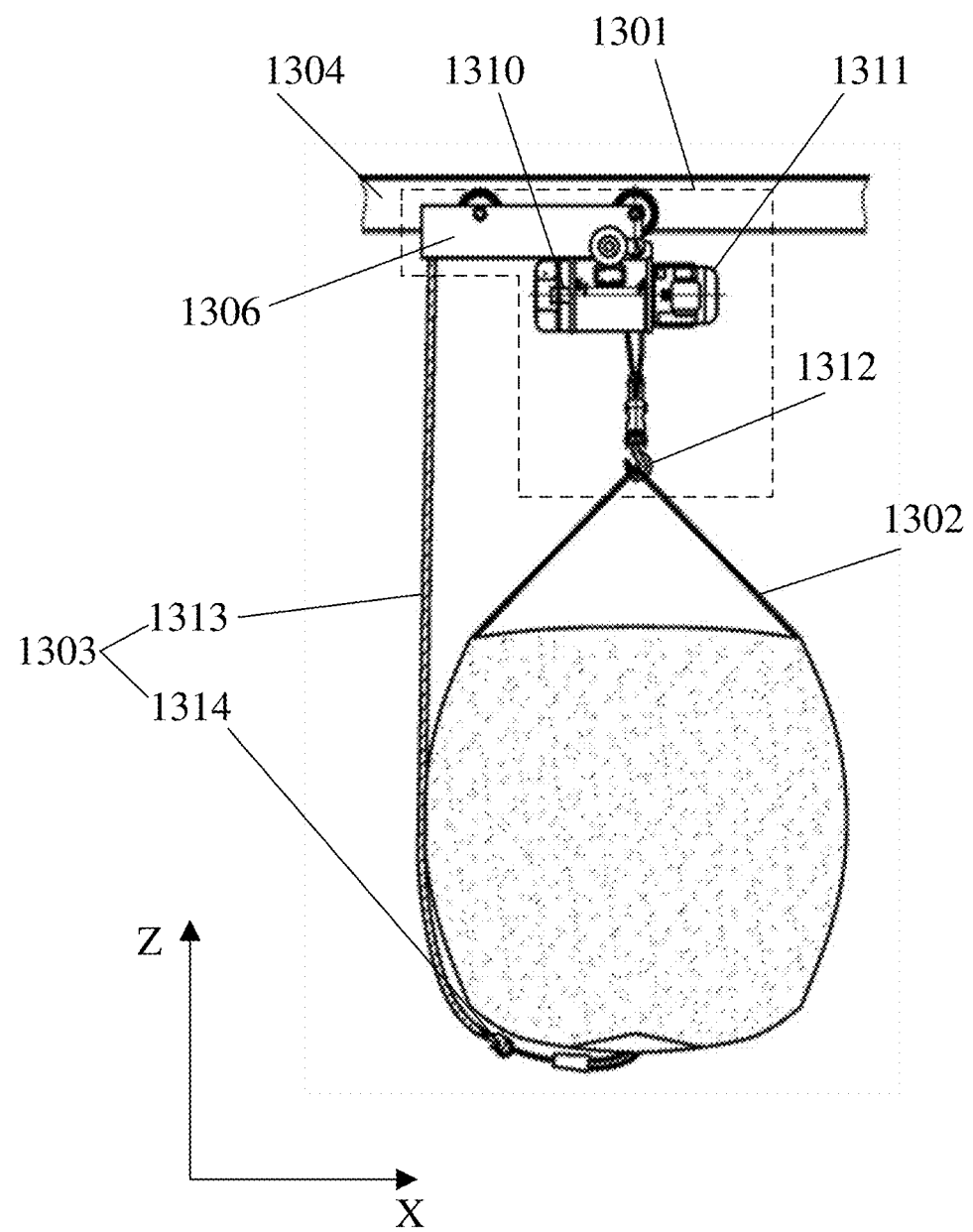
FIG. 4A is a schematically partial structural diagram of a hoisting device provided by at least one embodiment of the present disclosure.

FIG. 4A is a schematically partial structural diagram of a hoisting device provided by at least one embodiment of the present disclosure.

As shown in FIG. 1 and FIG. 4A, the hoisting device 1300 is located above the conveying device 1200. The hoisting device includes a hoist 1301. The hoist 1301 is configured to hoist the sand container 1302 (as shown in FIG. 4A). The hoisting device 1300 transports the sand in the sand container to the conveying device through the action of the hoist 1301. For example, the sand container 1302 is a bag or a box for storing the sand, and the embodiments of the present disclosure are not limited thereto. The hoisting device 1300 includes a plurality of truss structures to limit the movable range of the hoist. For example, the hoist moves along a first track 1304 in a first direction X of the drawing and a second track 1305 in a second direction Y of the drawing. The first track 1304 is provided on a support that is along the first direction X and above the ground in the drawing (for example, a plane where the base 1002 is located in the drawing is considered as the ground), and the second track 1305 is provided on a support that is along the second direction Y and above the ground in the drawing. Second tracks 1305 are located on both sides of the first track 1304. For example, the first direction X and the second direction Y are different from each other. For example, the first direction X and the second direction Y are perpendicular to each other. For example, the hoist 1301 is provided on the first track 1304. The first track 1304 moves along the second tracks 1305. As shown in FIG. 1, the hoist 1301 of the hoisting device 1300 moves simultaneously along a plurality of route segments in different directions between the first position where the hoist 1301 of the hoisting device 1300 is located and the position where the hopper 1220 is located, so as to realize the linear movement. For example, the hoist 1301 moves simultaneously in the first direction X and the second direction Y, that is, with the first track 1304 moving on the second track 1305, the hoist 1301 moves along the first track 1304, thereby realizing the rapid movement of the hoist 1301.

Figure 4B:
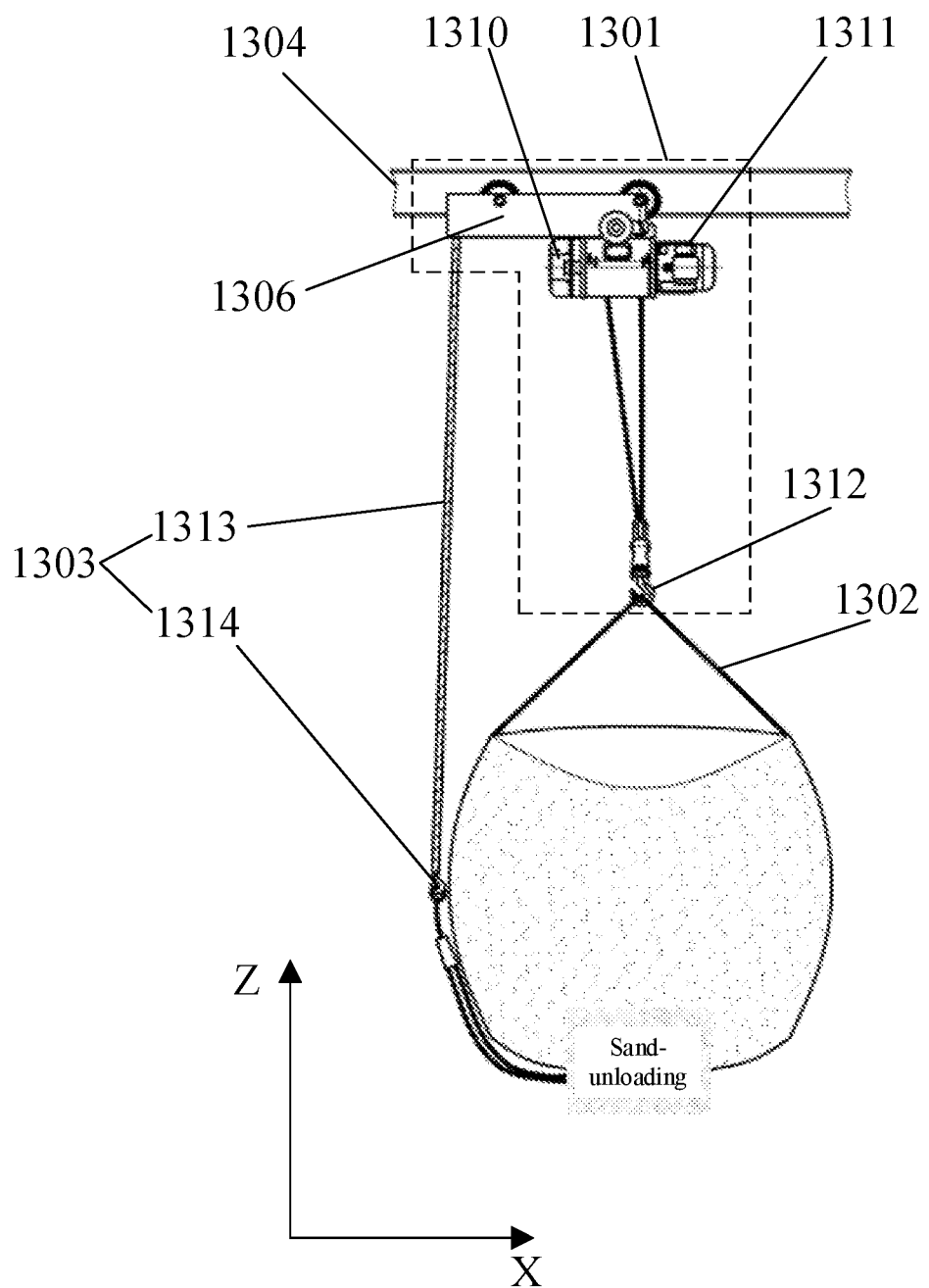
FIG. 4B is a schematically partial structural diagram of the hoisting device during unloading provided by at least one embodiment of the present disclosure.

FIG. 4B is a schematically partial structural diagram of the hoisting device during unloading provided by at least one embodiment of the present disclosure.

For example, as shown in FIG. 4A and FIG. 4B, the hoisting device 1300 further includes a sand unloading mechanism 1303, and the hoist 1301 includes a hanger 1312. The sand unloading mechanism 1303 is connected with both the hoist 1301 and an end (for example, the lower end) of the sand container 1302 away from the hoist 1301. The hanger 1312 is connected with an end (for example, the upper end) of the sand container 1302 closing to the hoist 1301. The sand unloading mechanism 1303 is configured to automatically unload the sand in the sand container 1302 to the hopper 1220 of the conveying device 1200, that is, to automatically unload the sand, so as to reduce the participation of personnel.

For example, as shown in FIG. 4A, the hoisting device 1300 is in a state of transporting the sand container 1302, and the hanger 1312 lifts or falls in a third direction Z (for example, the vertical direction). For example, the hoisting device includes a third motor 1311, and the third motor 1311 is configured to drive the hanger 1312 to move in the third direction Z. The third direction Z is perpendicular to the first direction X and the second direction Y. The sand unloading mechanism 1303 includes a traction rope 1313 and a hook 1314. In the state of FIG. 4A, the hook 1314 is connected with, for example, an latch that is located at the end (such as the lower end) away from the hoist 1301 of the sand container 1302 and configured to close a unloading outlet of the sand container 1302. The traction rope 1313 has a fixed length and is connected with the hoisting device 1300.

For example, as shown in FIG. 4B, in the case where the hoisting device 1300 transports the sand container 1302 to the position above the hopper 1220, the sand container 1302 on the hanger 1312 gradually falls. Under this case, the traction rope 1313 is gradually pulled tightly, so that the traction rope 1313 generates a pulling force on the latch. Under the action of the pulling force, the latch for fixing the sand container 1302 is pulled open, the unloading outlet for fixing the fixed sand container 1302 is opened, and the sand starts to be unloaded. In FIG. 4A and FIG. 4B, the sand container 1302 is taken as an example of a bag.

For example, in other embodiments, the sand container 1302 includes a storage box or the like. The unloading outlet below the storage box is provided with the latch for fixing a sealing box cover. In the case where the sand is uploaded, the sealing box cover is unlocked by the pulling force of the traction rope 1313 applied to the latch, thereby realizing the unloading of the sand.

For example, in some embodiments, as shown in FIG. 4A, the hoisting device 1300 further includes at least one first motor 1306. The total number of the at least one first motor 1306 shown in the drawing is one, and the embodiments of the present disclosure are not limited thereto. The first motor 1306 is configured to drive the hoist 1301 to move on the first track 1304, that is, to move in the first direction X.

Figure 5A:
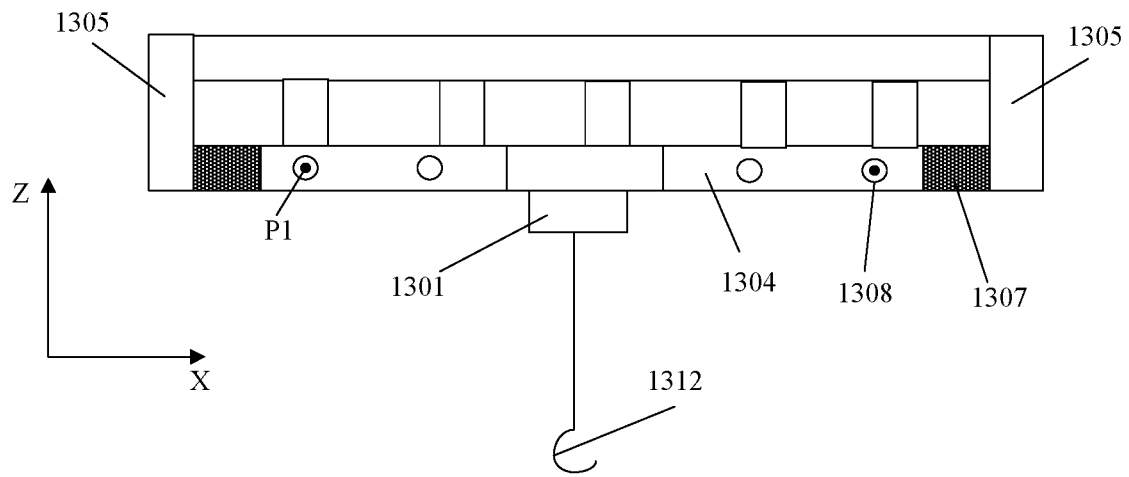
FIG. 5A is a schematically structural diagram of a first track provided by at least one embodiment of the present disclosure.
Figure 5B:
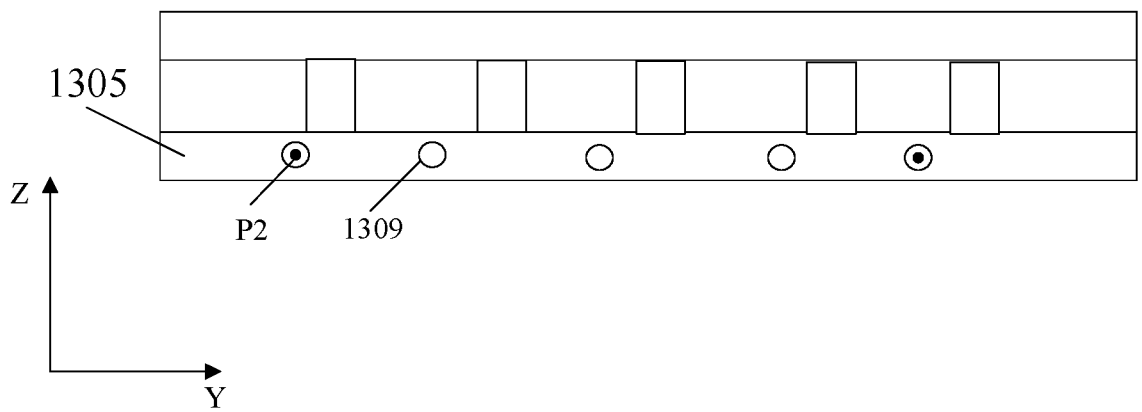
FIG. 5B is a schematically structural diagram of a second track provided by at least one embodiment of the present disclosure.

FIG. 5A is a schematically structural diagram of a first track provided by at least one embodiment of the present disclosure. FIG. 5B is a schematically structural diagram of a second track provided by at least one embodiment of the present disclosure.

For example, in some embodiments, as shown in FIG. 5A, the hoisting device 1300 further includes at least one second motor 1307. For example, the total number of at least one second motor 1307 is two, and the embodiments of the present disclosure are not limited thereto. Two second motors 1307 are located at two ends of the first track 1304 respectively. Each of the second motors 1307 is configured to drive the hoist 1301 to move on each of the second tracks 1305, that is, to move in the second direction Y.

It should be noted that the total number of at least one second motor 1307 is set according to design requirements, and the embodiments of the present disclosure are not limited thereto.

For example, as shown in FIG. 5A and FIG. 5B, a plurality of first limit sensors 1308 are provided on the first track 1304, and a plurality of second limit sensors 1309 are provided on the second track 1305. For example, the plurality of first limit sensors 1308 or the plurality of second limit sensors 1309 are arranged at equal intervals or at unequal intervals. The embodiments of the present disclosure are not limited to the setting mode and specific number of the plurality of first limit sensors 1308 or the plurality of second limit sensors 1309 as shown in the drawings. For example, the positions of the first limit sensors 1308 at two ends of the first track 1304 are for example arranged as the first utmost positions P1. For example, the positions of the second limit sensors 1309 at two ends of the second track 1305 are for example arranged as the second utmost positions P2. The hoist 1301 is configured to move on the first track 1304 without exceeding the first utmost positions P1 and to move on the second track 1305 without exceeding the second utmost positions P2, so as to avoid causing apparatus failure and other dangers.

For example, as shown in FIG. 4A, the sand conveying apparatus further includes a tilt-angle sensor 1310. The tilt-angle sensor 1310 is configured to detect the tilt angle between the hoist 1301 and the third direction Z during the movement of the hoist 1301 on the first track 1304 and the second track 1305. For example, in the case where the hoist 1301 hoists the sand container 1302, the tilt-angle sensor 1310 detects whether the center of gravity of the hoist 1301 and the center of the sand container 1302 are in the same straight line. For example, the tilt-angle sensor 1310 detects an angle between a line from the center of gravity of the hoist 1301 to the center of the sand container 1302 and the vertical direction (i.e., the third direction Z in the drawing). For example, the tilt-angle sensor 1310 detects a swing angle of the rope that is connected with the hanger of the hoist 1301. If the tilt angle is too large, it possibly causes damage to the hoist 1301. Thus, the detection is performed in real time according to the signal of the tilt-angle sensor 1310.

For example, in some embodiments, as shown in FIG. 1, the sand conveying apparatus 1000 further includes a power supply device 1001 and a base 1002. The power supply device 1001 supplies power to various devices in the sand conveying apparatus 1000 that require electrical energy, such as the first motor 1306, the second motor 1307, and so on. The base 1002 is configured to carry the sand conveying apparatus 1000.

As shown in FIG. 3, the sand conveying apparatus 1000 further includes a third track 1230 along the second direction Y. The conveying device 1200 is provided on the third track 1230 and moves along the third track 1230, so that the conveying device 1200 is allowed to correspond to the feed inlets 1111 of different storage tanks 1110 of the storage device 1100. Under this case, the belt assembly 1210 is in direct connection with the feed inlet 1111, thereby inputting the sand from the hopper 1220 to the storage tank 1110.

Figure 2:
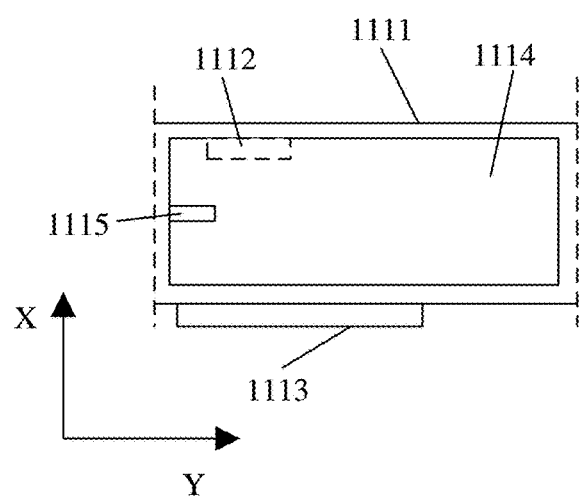
FIG. 2 is a schematically structural diagram of a feed inlet of a storage tank of a storage device provided by at least one embodiment of the present disclosure.

FIG. 2 is a schematically structural diagram of a feed inlet of a storage tank of a storage device provided by at least one embodiment of the present disclosure.

For example, in some embodiments, as shown in FIG. 2, the feed inlet 1111 of the storage tank 1110 is provided with a sand feeding shutter 1114. An opening sensor 1115 is provided on the sand feeding shutter 1114. The opening sensor 1115 is configured to detect the opening value of the sand feeding shutter 1114. In the case where the opening value of the sand feeding shutter 1114 is too small and does not meet the requirements, the belt assembly 1210 and the feed inlet 1111 cannot be completely butted with each other, which possibly causes the sand to be transported to the outside of the storage tank 1110 at the feed inlet. For example, each storage tank 1110 of the storage device 1100 is provided with a raw level detector 1112, and the raw level detector 1112 is configured to detect the storage amount of sand in the storage tank 1110. For example, the raw level detector 1112 is implemented as a weight sensor, an ultrasonic sensor, or a radar sensor, or a plurality of the raw level sensors. For example, the plurality of the raw level sensors are arranged at different heights of a side wall of the storage tank 1110.

Figure 6:
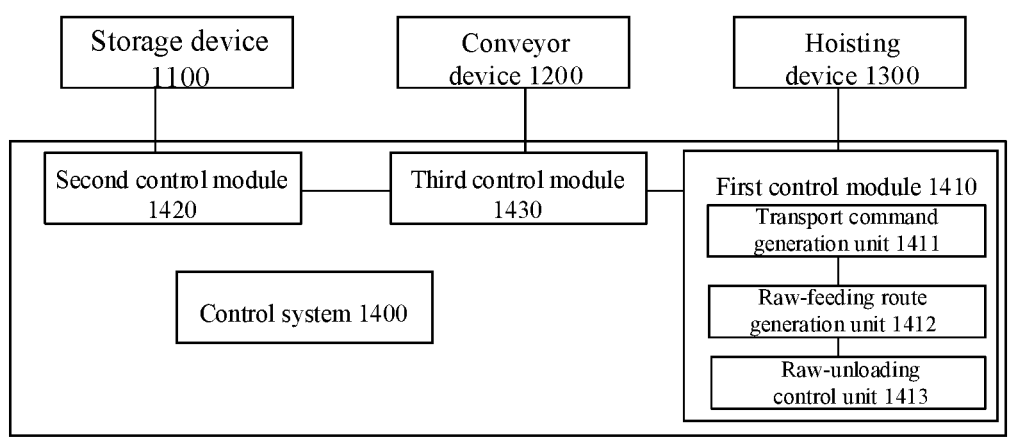
FIG. 6 is a schematic diagram of a control system provided by at least one embodiment of the present disclosure.

FIG. 6 is a schematic diagram of a control system provided by at least one embodiment of the present disclosure.

For example, in some embodiments, as shown in FIG. 6, the sand conveying apparatus further includes a control system 1400. The control system 1400 is in signal connection with the storage device 1100, the conveying device 1200, and the hoisting device 1300. The control system 1400 includes a first control module 1410, and the first control module 1410 is in signal connection with the hoisting device 1300. For example, the first control module 1410 includes a transport command generation unit 1411, a raw-feeding route generation unit 1412, and a raw-unloading control unit 1413.

For example, the transport command generation unit 1411 is configured to generate a sand transport command after the sand container 1302 is hung on the hoist 1301. For example, the sand transport command is used to instruct the hoist 1301 to move from the position where the hoist 1301 is located (i.e., the first position of the hoist 1301) to the position where the hopper 1220 of the conveying device 1200 is located (i.e., the position of the hopper 1220).

For example, the raw-feeding route generation unit 1412 is configured to generate a raw-feeding route between the first position of the hoist 1301 (for example, the position corresponding to the sand container) and the position of hopper 1220 of the conveying device 1200, in response to the sand transport command. The first position of the hoist 1301 is located above the sand container 1302, and the raw-feeding route includes a plurality of route segments in different directions. For example, a moving range of the hoist 1301 and a moving range of the hopper 1220 are established in a three-dimensional coordinate system. For example, the moving routes of the hoist 1301 in the first direction X and the second direction Y are generated according to the first position of the hoist 1301 and the position of the hopper 1220.

For example, the raw-unloading control unit 1413 is configured to control the hoist 1301 to move to a position above the hopper 1220 along the raw-feeding route and unload the sand in the sand container 1302 into the hopper 1220. During the process of moving the hoist 1301 to the position above the hopper along the raw-feeding route, the hoist 1301 moves simultaneously along the route segments of the plurality of route segments in different directions and reaches the position above the hopper 1220, thereby realizing a linear movement of the hoist between the first position of the hoist and the position of the hopper, and realizing the rapid movement and accurate control of the hoist 1301.

For example, in some embodiments, as shown in FIG. 6, the control system further includes a second control module 1420. The second control module 1420 is connected with the storage device 1200. The second control module 1420 is configured to respond to the storage amount of the sand in the storage tank 1110 and to generate a demand information corresponding to the storage tank 1110 in the case where the storage amount of the sand in the storage tank 1110 is insufficient. That is, in the case where the storage amount of the sand in a certain storage tank 1110 is insufficient, the conveying device 1200, according to the demand information, moves to a position corresponding to the storage tank 1110 to perform the sand conveying operation on the storage tank 1110.

For example, in some embodiments, as shown in FIG. 6, the control system 1400 further includes a third control module 1430. The third control module 1430 is connected with the conveying device 1200 and is configured to control the movement of the conveying device 1200 and the conveying of the sand. For example, the third control module 1430 is configured to generate and output a displacement route of the conveying device 1220 in response to the input demand information and the position of the hopper 1220 of the conveying device 1200. The demand information includes a demand information corresponding to a single storage tank 1110 or a demand information corresponding to a plurality of storage tanks 1110 arranged in sequence, that is, the storage amount of sand in one storage tank 1110 is insufficient or the sand in the plurality of storage tanks 1110 is insufficient. The third control module 1430 is further configured to control the conveying device 1200 to move to a position in correspondence to the single storage tank 1110 along the displacement route, or to control the conveying device 1200 to move one by one to the positions in correspondence to the plurality of storage tanks 1110 according to the arrangement sequence of the plurality of storage tanks 1110. Then, the conveying device 1200 conveys the sand to the storage tank 1110 through the belt assembly 1210.

For example, in some embodiments, as shown in FIG. 6, the third control module 1430 is further configured to control, after uploading the sand in the sand container 1302 into the hopper 1220, in the case where the conveying device 1200 is in a non-moving state, the belt assembly 1210 to convey the sand in the hopper 1220 of the conveying device 1200 to the storage tank 1110 corresponding to the conveying device 1200.

For example, in some embodiments, as shown in FIG. 2, the third control module 1430 further includes a proximity switch 1113, and the proximity switch 1113 is provided at the feed inlet 1111 of each storage tank 1110. In the case where the conveying device 1200 moves to the feed inlet 1111 of the storage tank 1110, the proximity switch 1113 outputs a proximity signal. The third control module 1430 is configured to determine that the conveying device 1200 corresponds to the storage tank 1110 according to the proximity signal. After determining that the conveying device 1200 corresponds to the storage tank 1110, the feed inlet 1111 of the storage tank 1110 is opened. For example, one of the feed inlets 1111 of the plurality of storage tanks 1110 as shown in FIG. 1 is opened at the same time.

For example, in some embodiments, as shown in FIG. 2, the second control module 1420 is configured, in the case where the conveying device 1200 corresponds to the storage tank 1110, to output a tank opening information of the storage tank 1110. The third control module 1420 is configured, to open the sand feeding shutter 1114 at the feed inlet 1111 of the storage tank 1110 and to control the belt assembly to run in response to the tank opening information, so as to convey the sand in the hopper 1220 into the storage tank 1110, in a case where the opening value of the sand feeding shutter 1114 is greater than a preset value.

It should be noted that the structures of various parts as shown in FIG. 2, FIG. 3, FIG. 5A, and FIG. 5B does not represent the actual structures, but to show the positions and connection relationship between various parts, and the embodiments of the present disclosure do not limited thereto.

For example, as shown in FIG. 6, the modules in the control system operate independently and communicate with each other. Even if one of the modules in the control system is damaged, it will not affect the operation of other control units. The control system is designed to be operated in three modes, including local buttons, HMI (Human Machine Interface) interface, and remote control. The local buttons are capable of directly controlling the actions of the corresponding components to keep the operation running, in the case where the control system is failure. The HMI interface and the remote control are mutually backup. The remote control is configured as the main operating component during normal operations. The HMI interface is capable of performing all operations in the case where the remote control is failure.

Many functional components described in the description are all called units (such as the transport command generation unit, the raw-feeding route generation unit, the raw-unloading control unit) in order to more particularly emphasize the independence of implementation.

In the embodiments of the present invention, the units may be achieved by software so as to be executed by various types of processors. For example, a marked executable code unit may include one or more physical or logical blocks of a computer instruction, and for instance, may be constructed as an object, a procedure or a function. Even so, executable codes of the marked unit are not required to be physically located together but may include different instructions stored on different physical blocks. When the instructions are logically combined, a unit is constructed and the predetermined object of the unit is achieved.

Actually, the executable code unit may include a single instruction or many instructions which may even be distributed on a plurality of different code segments, distributed in different programs, and distributed on a plurality of storage devices. Similarly, operational data may be identified in the unit, achieved by any appropriate means and organized in any appropriate type of data structure. The operational data may be collected as a single data set or may be distributed at different positions (including the case of being distributed on different storage devices) and may at least partially exist on a system or a network by being only taken as electronic signals.

When the unit can be achieved by software, in view of the level of the traditional hardware technology, those skilled in the art can establish corresponding hardware circuits on units capable of being achieved by software to achieve corresponding functions regardless of the cost. The hardware circuits include conventional very large scale integration (VLSI) circuits or gate arrays and conventional semiconductors such as logic chips and transistors or other discrete elements. The unit may also be achieved by programmable hardware units such as field programmable gate arrays, programmable logic arrays and programmable logical devices.

The embodiments of the present disclosure further provide a control method of any one of the above-mentioned sand conveyor apparatus.

Figure 7:
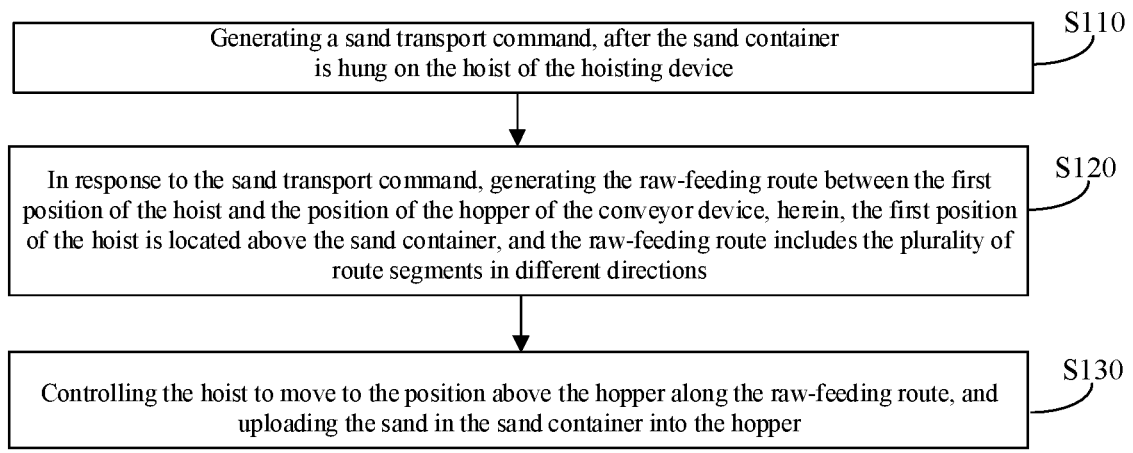
FIG. 7 is a schematic flow chart of a control method of the sand conveying apparatus provided by at least one embodiment of the present disclosure.

FIG. 7 is a schematic flow chart of a control method of the sand conveying apparatus provided by at least one embodiment of the present disclosure. The control method described in FIG. 7 includes step S110 to step S130.

Step S110: generating a sand transport command, after the sand container is hung on the hoist of the hoisting device.

For example, as shown in FIG. 1, the sand transport command is used to instruct the hoist 1301 to move from the first position of the hoist 1301 where the hoist 1301 is located to the position of the hopper 1220 of the conveying device 1200.

For example, in some embodiments, before the sand container is hung on the hoist, if the hoist is located at a second position different from the first position, a moving route is generated between the first position and the second position of the hoist, and the hoist is controlled to move to the first position along the moving route. For example, as shown in FIG. 4A, the first position of the hoist 1301 is located above the sand container 1302. In the case where the sand container 1302 is not hung on the hanger 1312 of the hoist 1301, if the hoist 1301 is not above the sand container 1302, the hoist 1301 needs to be moved to the first position, in order to allow the sand container 1302 to be hung on the hanger 1312.

For example, in some embodiments, as shown in FIG. 4A, after the hoist 1301 is moved to the first position, the hanger 1312 of the hoist 1301 falls along the third coordinate axis Z to hang the sand container 1302. After the sand containing 1302 is hung on the hanger 1312 of the hoist 1301, the hanger 1312 of the hoist 1301 rises along the third coordinate axis Z, until the hanger 1312 of the hoist 1301 reaches a third utmost position in a direction of third coordinate axis Z within the moving range of the coordinate system. The third utmost position is the highest position of the hanger 1312 in the vertical direction. That is, the third utmost position is defined by the height of the first track 1304 and the second track 1305 (on which the hoist is provided) in the direction of third coordinate axis Z.

Step S120: in response to the sand transport command, generating the raw-feeding route between the first position of the hoist and the position of the hopper of the conveying device, herein, the first position of the hoist is located above the sand container, and the raw-feeding route includes the plurality of route segments in different directions. For example, after the hoist reaches the highest position of the moving range (the maximum height where the hanger is located in the direction of third coordinate axis Z), projection points of the first position of the hoist and the position of the hopper on a plane where the position of the hoist is located (i.e., the plane where the first coordinate axis X and the second coordinate axis Y are located) are called, and then the raw-feeding route are drawn and output.

For example, as shown in FIG. 1, the coordinate system is established based on the action range of the hoisting device 1300. The coordinate system includes the first coordinate axis X, the second coordinate axis Y, and the third coordinate axis Z (respectively corresponding to the first direction, the second direction, and the third direction). According to scale information, the positions of the hoist 1300 and the hopper 1220 (shown in FIG. 3) are marked in the coordinate system, and the positions of the hoist 1300 and the hopper 1220 are updated in real time. The moving range of the hoist 1220 is set in the coordinate system. For example, the moving range of the hoist 1220 is the range defined by the first track 1304 and the second track 1305. For example, an origin of the coordinate system is the grounding point of the vertical truss in FIG. 1, or any one of intersection points between the first track 1304 and the second tracks 1305, and the embodiments of the present disclosure are not limited thereto.

It should be noted that in the embodiments of the present disclosure, the symbol X represents the first coordinate axis and the first direction, Y represents the second coordinate axis and the second direction, and Z represents the third coordinate axis and the third direction.

Step S130: controlling the hoist to move to the position above the hopper along the raw-feeding route, and uploading the sand in the sand container into the hopper.

For example, in some embodiments, after the sand in the sand container is unloaded into the hopper, the control method further includes: controlling the hoist to return to the first position of the hoist along the raw-feeding route, so as to continue a next sand transportation. For example, the hoist is controlled to move to the position above the hopper along the raw-feeding route, and the hoist is further controlled to make a reciprocating movement for once between the current position of the hoist and the raw unloading position of the hopper.

For example, in some embodiments, the controlling the hoist to move to the position above the hopper along the raw-feeding route includes: controlling the hoist to move simultaneously along the route segments of the plurality of route segments in different directions and reach the position above the hopper, thereby realizing the linear movement of the hoist between the first position and the position of the hopper.

For example, in some embodiments, the controlling the hoist to move to the position above the hopper along the raw-feeding route includes: controlling the hoist to move simultaneously on the first track and the second track. For example, as shown in FIG. 4A and FIG. 5A, the first motor 1306 is configured to drive the hoist 1301 to move on the first track 1304, and each of the second motors 1307 is configured to drive the hoist 1301 to move on each of the second tracks 1305.

For example, the hoisting device 1300 has an automatic positioning function without manual intervention in the whole process. For example, the automatic positioning function are classified into automatic walking function and automatic returning function. During the automatic walking process, the current position of the feed inlet and the current state of the motors (the above-mentioned first and second motors) for driving the hoist 1301 of the hoisting device 1300 are first read. After it is determined to be normal, the hanger 1312 of the hoist 1301 is automatically controlled to lift or fall and to move in the first direction and the second direction according to the preset control program. In order to reduce the running time, the hoist 1301 moves in the first direction and the second direction at the same time. After the hoist 1301 reaches the position above the hopper 1220, the hanger 1312 is driven to fall and then the sand is unloaded. During the automatic return process, according to the predetermined position coordinates during the automatic walking, the hanger 1312 of the hoist 1301 is automatically controlled to lift or fall and to move in the first direction and the second direction according to the preset control program, thereby reducing the moving time and improving the moving stability and efficiency of the hoist 1301.

For example, in some embodiments, the control method includes: controlling the hoist to move on the first track without exceeding the first utmost positions and to move on the second track without exceeding the second utmost positions. For example, as shown in FIG. 4A and FIG. 4B, the plurality of first limit sensors 1308 are provided on the first track 1304, and the plurality of second limit sensors 1309 are provided on the second track 1305. For example, the positions of the first limit sensors 1308 at the two ends of the first track 1304 are the first utmost positions P1. For example, the positions of the second limit sensors 1309 at the two ends of the second track 1305 are the second utmost positions P2. The hoist 1301 is configured to move on the first track 1304 without exceeding the first utmost positions P1 and to move on the second track 1305 without exceeding the second utmost positions P2, so as to avoid causing apparatus failure and other dangers.

For example, in some embodiments, the first limit sensors 1308 and the second limit sensors 1309 are implemented as photoelectric sensors, that is, in the case where the hoist 1301 passes the photoelectric sensor, a trigger signal is generated while a light signal of the photoelectric sensor is blocked.

Figure 8:
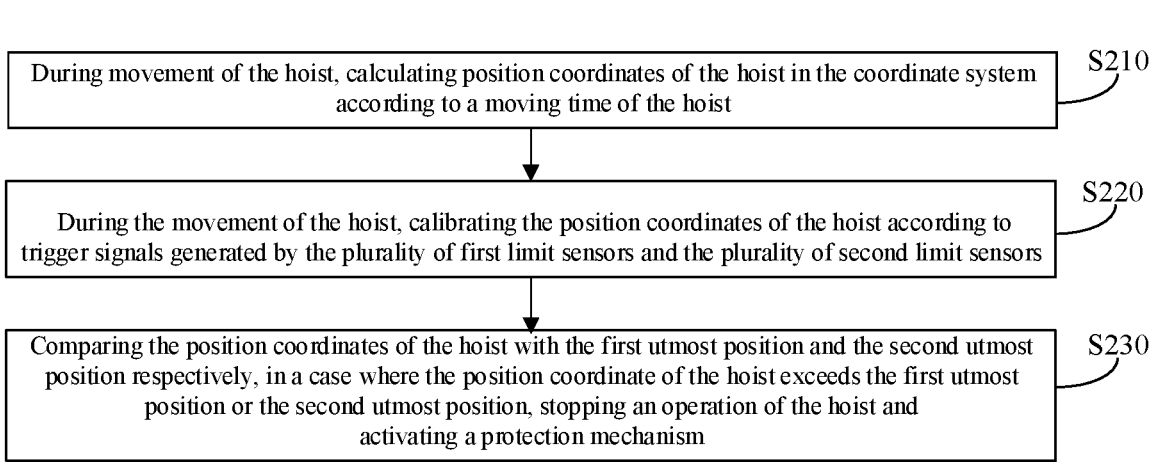
FIG. 8 is a schematic flow chart of a control method of the sand conveying apparatus according to at least one embodiment of the present disclosure.

FIG. 8 is a schematic flow chart of a control method of the sand conveying apparatus provided by at least one embodiment of the present disclosure. The control method as shown in FIG. 8 includes step S210 to step S230. Step S210 to step S230 are used to control the hoist to move on the first track without exceeding the first utmost positions and to move on the second track without exceeding the second utmost positions.

Step S210: during movement of the hoist, calculating position coordinates of the hoist in the coordinate system according to a moving time of the hoist. For example, as shown in FIG. 4A and FIG. 4B, the moving speed of the hoist 1301 on the first track 1304 and the second track 1305 is a preset value. According to the moving time of the hoist 1301, the moving distances of the hoist 1301 in the direction of first direction X (the first track 1304) and in the direction of second coordinate Y (the second track 1305) are determined, and the position coordinates of the hoist 1301 are also determined.

Step S220: during the movement of the hoist, calibrating the position coordinates of the hoist according to trigger signals generated by the plurality of first limit sensors and the plurality of second limit sensors. For example, as shown in FIG. 4A and FIG. 4B, in the case where the hoist 1301 moves on the first track 1304 and the second track 1305, the corresponding signal is triggered every time while the hoist 1301 passes one of the plurality of first limit sensor 1308 or one of plurality of second limit sensor 1309, so as to monitor the position of the hoist 1301 in real time. For example, according to the moving time, it is concluded that the position of the hoist 1301 on the first track 1304 is at the left end (that is, it exceeds the first limit sensor 1308 at P1) and the position of the hoist 1301 on the second track 1305 is at the left end (that is, it exceeds the second limit sensor 1309 at P2), and both the first limit sensor 1308 at P1 and the second limit sensor 1309 at P2 generate trigger signals, thus it is determined that the position of the hoist 1301 exceeds the first limit sensor 1308 at P1 and exceeds the second limit sensor 1309 at P2, thereby further determining that the position coordinates of the hoist 1301 calculated in step S210 are reliable.

Step S230: comparing the position coordinates of the hoist with the first utmost position and the second utmost position respectively, in a case where the position coordinate of the hoist exceeds the first utmost position or the second utmost position, stopping an operation of the hoist and activating a protection mechanism. For example, according to the position coordinates of the hoist 1301 obtained in step S210 and step S220, it is determined that the hoist 1301 exceeds the first utmost position P1 and the second utmost position P2.

It should be noted that in the case where the position coordinate of the hoist exceeds at least one of the first utmost position and the second utmost position, the operation of the hoist is stopped.

For example, in other embodiments, in step S220, according to the moving time, it is concluded that the position of the hoist 1301 on the first track 1304 is at the left end (that is, it exceeds the first limit sensor 1308 at P1) and the position of the hoist 1301 on the second track 1305 is at the left end (that is, it exceeds the second limit sensor 1309 at P2). Although neither of the first limit sensor 1308 at P1 and the second limit sensor 1309 at P2 generates the trigger signal due to the failure of the limit sensors, the other first limit sensor 1308 and the other second limit sensor 1309 generate the trigger signals. Under this case, the position coordinates of the hoist 1301 calculated in step S210 are further verified according to the trigger signals generated from the other first limit sensors and second limit sensors and based on the time interval of the trigger signals or the time of the latest trigger signal.

For example, the above-mentioned step S210 to step S230 are achieved in a way by combining software calculation with hardware signals, so as to allow the hoist to be controlled to move on the first track without exceeding the first utmost positions and to move on the second track without exceeding the second utmost positions, thereby avoiding the failure of the hoist 1301 caused by the failure of the limit sensors. For example, in the case where the calculated position coordinates exceed the safety limit and there is no signal generated from the limit sensor, the protection mechanism is triggered to prevent the hoist 1301 from continuing to run under the case where the limit sensor fails, thereby avoiding any safety accident.

For example, in some embodiments, the unloading the sand in the sand container into the hopper includes: automatically unloading the sand in the sand container into the hopper through the sand unloading mechanism. As shown in FIG. 4A and FIG. 4B, the hoisting device 1300 further includes the sand unloading mechanism 1303, and the hoist 1301 includes the hanger 1312. The sand unloading mechanism 1303 is connected with both the hoist 1301 and an end (for example, the lower end) of the sand container 1302 away from the hoist 1301. The hanger 1312 is connected with an end (for example, the upper end) of the sand container 1302 close to the hoist 1301. The sand unloading mechanism 1303 is configured to automatically unload the sand in the sand container 1302 to the hopper 1220 of the conveying device 1200, that is, to automatically unload the sand, so as to reduce the participation of personnel. The process of automatic sand unloading may be referred to the previous description, which will not be repeated here.

For example, in some embodiments, the control method further includes: during the movement of the hoist along the raw-feeding route, detecting the tilt angle between the hoist and the third coordinate axis by using the tilt-angle sensor and sending an alarm information in the case where the tilt angle is greater than an warning threshold, and stopping the operation of the hoist in the case where the tilt angle is greater than a safety threshold. For example, as shown in FIG. 4A, the tilt-angle sensor 1310 is configured to detect the tilt angle between the hoist 1301 and the third direction Z during the movement of the hoist 1301 on the first track 1304 and the second track 1305. For example, the tilt-angle sensor 1310 detects a swing angle of the rope that is connected with the hanger of the hoist 1301. If the tilt angle is too large, it possibly causes damage to the hoist 1301. That is, in a case where the center of gravity of the sand container 1302 is lifted, if the suspended object is not in the same straight line as the hoist, it will cause the hoist to tilt. In the case where the tilt-angle sensor detects that the tilt angle is greater than the warning threshold, an alarm will be sent out.

In the case where the tilt angle is greater than the safety threshold, the operation of the hoist is cut off to prevent damage to the hoist during diagonal pulling.

Figure 9:
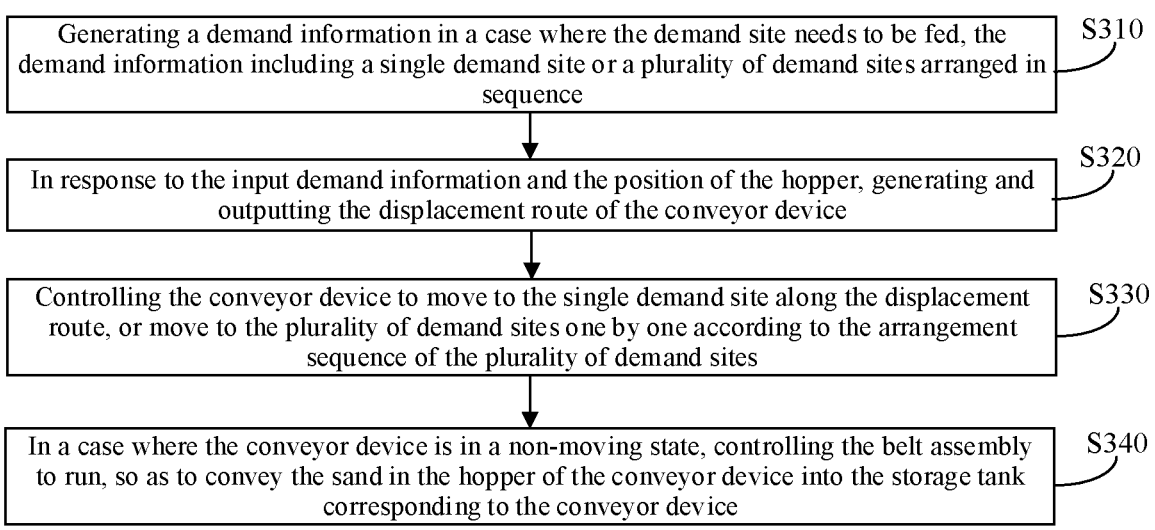
FIG. 9 is a schematic flow chart of a control method of the sand conveying apparatus provided by at least one embodiment of the present disclosure.

FIG. 9 is a schematic flow chart of a control method of the sand conveying apparatus provided by at least one embodiment of the present disclosure. The control method shown in FIG. 9 includes step S310 to step S320.

Step S310: generating a demand information in a case where the demand site needs to be fed, the demand information including a single demand site or a plurality of demand sites arranged in sequence. For example, as shown in FIG. 1, the storage device 1100 includes a plurality of storage tanks 1110. In the coordinate system, each storage tank 1100 corresponds to one of the demand sites. For example, in the case where the storage amount of sand in the storage tank 1100 is insufficient, the storage tank 1100 generates the demand information. For example, the plurality of demand sites are distinguished from one another by marks.

Step S320: in response to the input demand information and the position of the hopper, generating and outputting the displacement route of the conveying device. For example, as shown in FIG. 3, the sand conveying apparatus 1000 further includes a third track 1230 along the second direction Y. The conveying device 1200 is provided on the third track 1230 and moves along the third track 1230. For example, the displacement route of the conveying device is along the third track.

Step S330: controlling the conveying device to move to the single demand site along the displacement route, or move to the plurality of demand sites one by one according to the arrangement sequence of the plurality of demand sites. For example, as shown in FIG. 1, the conveying device 1200 moves to the single storage tank 1110 or moves to the plurality of storage tanks 1110 sequentially. For example, the motor is configured to control the movement of the conveying device 1200, and the lateral movement of the conveying device 1200 is controlled by the start or stop of the motor. For example, in the case where a movement command is sent, the rotation direction of the motor is judged according to the difference between the feed inlet of the storage tank 1110 corresponding to the demand site and the current position of the conveying device 1200, and then the motor is controlled to run. While the belt assembly of the conveying device 1200 reaches the designated position of the feed inlet, the motor stops running.

Step S340: in a case where the conveying device is in a non-moving state, controlling the belt assembly to run, so as to convey the sand in the hopper of the conveying device into the storage tank corresponding to the conveying device. For example, the belt assembly 1210 of the conveying device 1200 is in direction connection with the feed inlet of the storage tank 1110, so as to convey the sand in the hopper 1220 to the storage tank 1110. That is, in the case where the storage amount of sand in a certain storage tank 1110 is insufficient, according to the demand information, the conveying device 1200 moves to a position corresponding to the storage tank 1110 to perform the sand conveying operation on the storage tank 1110.

For example, in some embodiments, in the case where the conveying device moves to the single demand site or in the case where the conveying device moves to the last one of the plurality of demand sites, an arrival information is output and the conveying device is controlled to stop moving. For example, in some embodiments, the convey device and the hoist do not move simultaneously. If the movement instructions of the conveying device and the hoist are received simultaneously, the conveying device will be moved first, in order to allow enough time for the sand conveying operation to perform the sand conveying operation, so as to avoid moving the sand conveying apparatus before the sand conveying is completed.

For example, in some embodiments, the storage amount of sand in the storage tank 1110 is controllable. For example, as shown in FIG. 2, each storage tank 1110 of the storage device 1100 is provided with the raw level detector 1112, and the raw level detector 1112 is configured to detect the storage amount of sand in the storage tank 1110. For example, the raw level detector 1112 is implemented as a weight sensor, an ultrasonic sensor, a radar sensor, or a plurality of raw level sensors. For example, the plurality of raw level sensors are arranged at different heights of the side wall of the storage tank 1110. For example, the real-time monitoring of the raw level of the storage tank 1110 is realized by using the raw level sensors mounted in the storage tank 1110. In the case where the sand level in the tank rises to the mounting position of the raw high-level sensor (the highest raw level sensor), the signal contact of the raw level sensor is closed and detected, the acousto-optic alarm is controlled to send alarm, and the running of the belt assembly 1210 is automatically stopped to prevent the proppant from overflowing from the storage tank 1110. In the case where the sand level in the storage tank 1110 falls below the mounting position of the raw low-level sensor (the lowest raw level sensor), the signal contact of the raw low-level sensor is disconnected and detected, and the acousto-optic alarm is controlled to send an alarm of the raw low-level sensor. According to the above-mentioned mode, the automatic metering function is realized. For example, a metering mode is carried out by: based on the times for lifting or dropping the sand containers through the hoist, calculating the added-sand weight according to the sand weight in each sand container. In the case where the sand container is lifted, the weight of the hoist is recorded according to the weight change of the weight sensor, and in the case where the sand container is moved onto a conveying belt through the hoist, the secondary weight is added to the recorded total weight to realize the weight accumulation.

For example, in some embodiments, in the case where there is no sand on the belt assembly, a completion information is output. For example, the raw level sensor or the weight sensor is provided on the belt assembly to realize real-time monitoring of the sand on the belt assembly.

Figure 10:
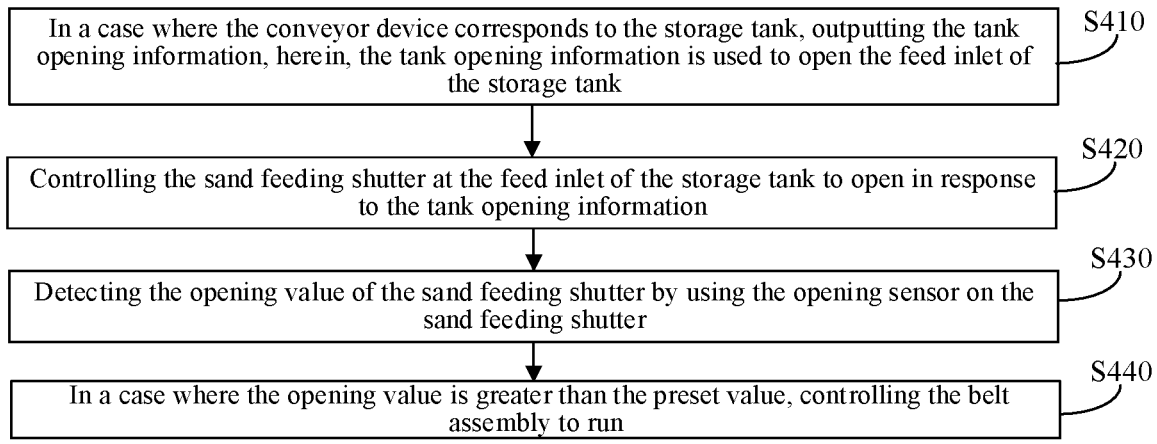
FIG. 10 is a schematic flow chart of a control method of the sand conveying apparatus provided by at least one embodiment of the present disclosure.

FIG. 10 is a schematic flow chart of a control method of the sand conveying apparatus provided by at least yet another embodiment of the present disclosure. The control method shown in FIG. 10 includes step S410 to step S440.

Step S410: in a case where the conveying device corresponds to the storage tank, outputting the tank opening information, herein, the tank opening information is used to open the feed inlet of the storage tank. For example, in the case where the conveying device does not correspond to the storage tank, the tank closing information is output.

For example, in some embodiments, the proximity switch is provided at the feed inlet of the storage tank. In the case where the conveying device moves to the feed inlet of the storage tank, it is determined that whether the conveying device corresponds to the storage tank according to the proximity signal sent by the proximity switch. As shown in FIG. 2, the proximity switch 1113 is provided at the feed inlet 1111 of each storage tank 1110. In the case where the conveying device 1200 moves to reach the feed inlet 1111 of the storage tank 1110, the proximity switch 1113 outputs the proximity signal. The third control module 1430 is configured to determine that the conveying device 1200 corresponds to the storage tank 1110 according to the proximity signal.

For example, in other embodiments, read-write mediums configured for being matched with each other are provided at the feed inlet 1111 and the conveying device 1200 respectively. For example, the read-write mediums includes but is not limited to chips based on NFC, RFID, or other information transmission modes.

For example, in some embodiments, one of the plurality of storage tanks 1110 of the storage device 1100 sends out the tank opening information at the same time.

Step S420: controlling the sand feeding shutter at the feed inlet of the storage tank to open in response to the tank opening information.

Step S430: detecting the opening value of the sand feeding shutter by using the opening sensor on the sand feeding shutter.

Step S440: in a case where the opening value is greater than the preset value, controlling the belt assembly to run.

For example, as shown in FIG. 2, the feed inlet 1111 of the storage tank 1110 is provided with the sand feeding shutter 1114. The opening sensor 1115 is provided on the sand feeding shutter 1114. The opening sensor 1115 is configured to detect the opening value of the sand feeding shutter 1114. For example, in response to the opening information, the sand shutter 1114 at the feed inlet 1111 of the storage tank 1110 is controlled to open. In the case where the opening value of the sand feeding shutter 1114 is greater than the preset value, the belt assembly 1210 is controlled to run, so as to convey the sand in the hopper 1220 into the storage tank 1110. For example, the motor control for the belt conveying is realized by combining the switch state of the feed inlet 1111 of the storage tank 1110. In the case where it is detected that the belt assembly 1210 is at the position of the feed inlet 1111, the sand feeding shutter 1114 at the feed inlet 1111 is automatically controlled to open to the designated position, whereas the shutters at other feed inlets are closed. The opening value of the shutter may be detected by the opening sensor mounted on the sand feeding shutter 1114. In the case where it is judged that the opening value of the sand feeding shutter on a top of the tank is greater than the preset value and the conveying device is at the position corresponding to the feed inlet, the conveying action of the belt assembly 1210 is allowed to start, thereby preventing the belt assembly 1210 from conveying the sand to the outside of the storage tank 1110.

Figure 11:
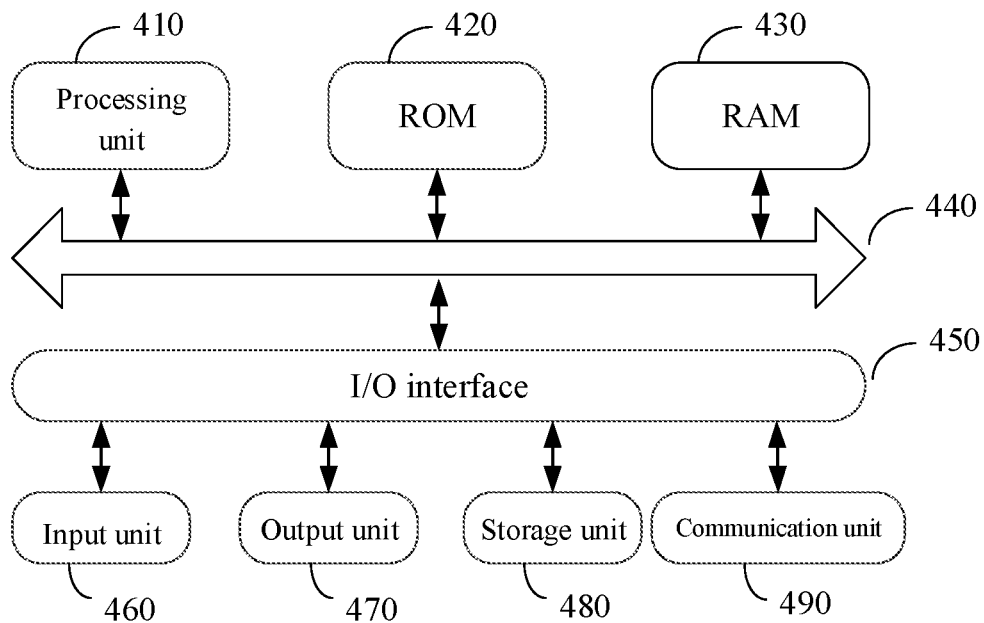
FIG. 11 is a schematically structural diagram of a control device provided by at least one embodiment of the present disclosure.

FIG. 11 is a schematically structural diagram of a control device provided by at least one embodiment of the present disclosure.

The control device 400 for the sand conveying apparatus as shown in FIG. 11 is, for example, suitable for implementing the control method of the sand conveying apparatus provided by the embodiments of the present disclosure. The control device 400 used for the sand conveying apparatus may be a terminal device, such as a personal computer, a laptop computer, a tablet computer, a mobile phone, etc., or the control device may also be a workstation, a server, a cloud service, and the like. It should be noted that the control device 400 for the sand conveying apparatus as shown in FIG. 11 is only an example, which does not bring any limitation to the function and the range of application of the embodiments of the present disclosure.

As shown in FIG. 11, the control device 400 for the sand conveying apparatus includes a processing unit (for example, a central processor, a graphics processor, etc.) 410, which performs various appropriate actions and processes according to the program stored in a read-only memory (ROM) 420 or the program loaded from a storage unit 480 into a random access memory (RAM) 430. Various programs and data required for the operation of the control device 400 of the sand conveying device are further stored in the RAM 430. The processing unit 410, the ROM 420, and the RAM 430 are connected with one another through a bus line 440. An input/output (I/O) interface 450 is further connected with the bus line 440.

Generally, the devices connected with the I/O interface 450 includes at least one of an input unit 460, an output unit 470, a storage unit 480, and a communication unit 490. For example, the input unit 460 includes a touch screen, a touch pad, a keyboard, a mouse, a camera, a microphone, an accelerometer, a gyroscope, and the like. For example, the output unit 470 includes a liquid crystal displays (LCD), a speaker, a vibrator, and the like. For example, the storage unit 480 includes a magnetic tape, a hard disk, and the like. For example, the communication unit 490 allows the control device 400 for the sand conveying apparatus to perform wireless or wired communication with other electronic devices to exchange data. Although FIG. 11 shows the control device 400 for the sand conveying apparatus includes various devices, it should be understood that it is not required to implement or have all the devices shown in the drawings, and the control device 400 for the sand conveying apparatus may be substituted to implement or have more or fewer devices.

For example, according to the embodiments of the present disclosure, the above-mentioned control method of the sand conveying device is implemented as a computer software program. For example, the embodiments of the present disclosure include a computer program product, which includes a computer program carried by a non-transitory computer readable medium, and the computer program includes a program code for executing the above-mentioned control method of the sand conveyor apparatus. In such embodiment, the computer program may be downloaded and installed from the internet through the communication unit 490, or installed from the storage unit 480, or installed from the ROM 420. In the case where the computer program is executed by the processing unit 410, the functions defined in the control method of the sand conveying apparatus provided in the embodiments of the present disclosure can be executed.

At least one embodiment of the present disclosure further provides a storage medium for storing non-transitory computer program executable code (for example, computer executable instructions). In the case where the non-transitory computer program executable code is executed by the computer, the control method of the sand conveying apparatus according to any embodiment of the present disclosure can be realized. Alternatively, in the case where the non-transitory computer program executable code is executed by a computer, the control method of the sand conveying apparatus according to any embodiment of the present disclosure can be realized.

Figure 12:
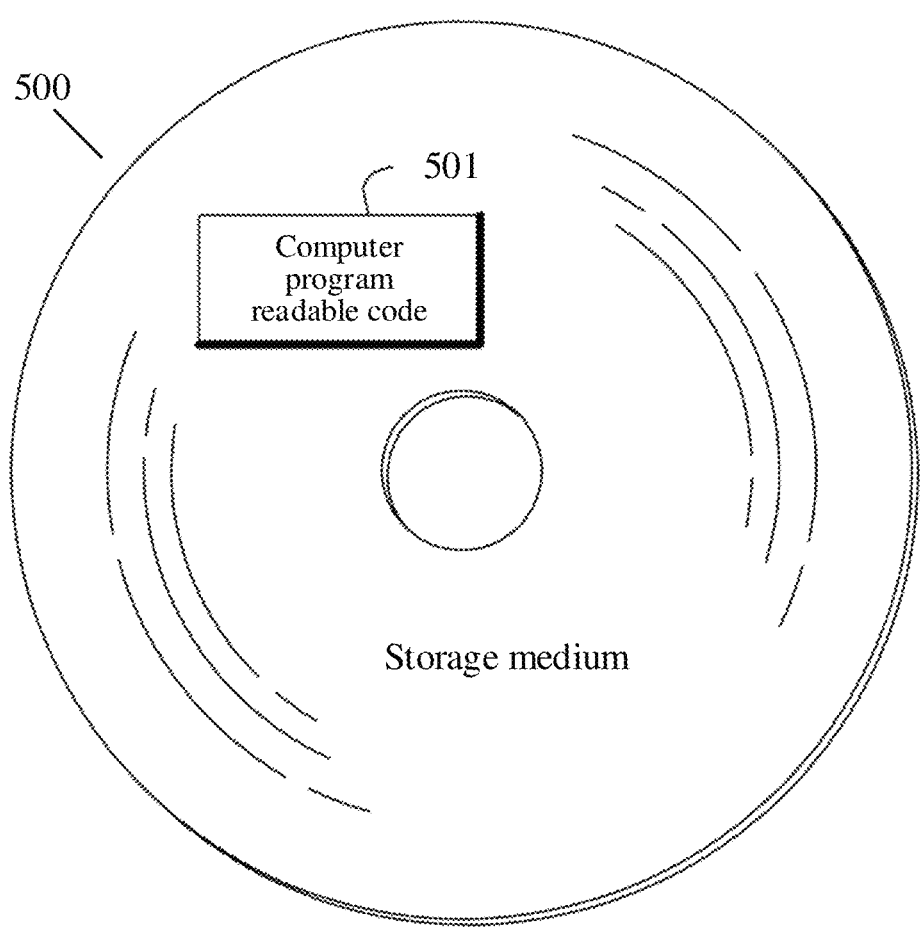
FIG. 12 is a schematic diagram of a storage medium provided by at least one embodiment of the present disclosure.

FIG. 12 is a schematic diagram of a storage medium provided by at least one embodiment of the present disclosure. As shown in FIG. 12, a storage medium 500 non-transitorily stores a computer program executable code 501. For example, in the case where the computer program executable code 501 is executed by the computer, one or more steps in the control method of the sand conveying apparatus described above can be executed.

For example, the storage medium 500 is applied to the above-mentioned control device 400 for the sand conveyor apparatus. For example, the storage medium 500 is the ROM 420 in the control device 400 for the sand conveying apparatus as shown in FIG. 11. For example, for the relevant description of the storage medium 500, reference may be made to the corresponding description of the ROM 420 in the control device 400 for the sand conveying apparatus as shown in FIG. 11, which will not be repeated here.

The following statements should be noted:
(1) The accompanying drawings involve only the structure(s) in connection with the embodiment(s) of the present disclosure, and other structure(s) can be referred to common design(s).
(2) In case of no conflict, the embodiments of the present disclosure and the features in the embodiments can be combined with each other to obtain new embodiments.

The above are merely specific implementations of the present disclosure without limiting the protection scope of the present disclosure thereto. Any person familiar with the technical field can easily think of changes or substitutions within the technical scope disclosed in the present disclosure, which should be covered within the protection scope of the present disclosure. Therefore, the protection scope of the present disclosure should be based on the protection scope of the appended claims.

The invention claimed is:

1. A sand conveying apparatus, comprising:
a storage device, located above an area where sand needs to be input;
a conveying device, connected with the storage device, wherein the conveying device comprises a hopper, the hopper is configured to receive the sand, and the conveying device is configured to convey the sand to the storage device; and
a hoisting device, located above the conveying device, wherein the hoisting device comprises a hoist, the hoist is configured to hoist a sand container, the hoisting device is configured to transport the sand in the sand container to the conveying device through an action of the hoist, and the hoist of the hoisting device is configured to move simultaneously along a plurality of route segments in different directions, so as to realize a linear movement between a first position where the hoist is located and a position where the hopper is located,
wherein a coordinate system is established based on an action range of the hoisting device, and according to a scale information, positions of the hoist and the hopper are marked in the coordinate system and updated in real time, and a moving range of the hoist is set in the coordinate system.

2. The sand conveying apparatus according to claim 1, further comprising:
a control system, signally connected with the storage device, the conveying device, and the hoisting device, and the control system comprising a first control module, wherein the first control module is in signal connection with the hoisting device;
wherein the first control module comprises:
a transport command generation unit, configured to generate a sand transport command after the sand container is hung on the hoist,
a raw-feeding route generation unit, configured to generate a raw-feeding route between the first position where the hoist is located and the position where the hopper of the conveying device is located in response to the sand transport command, wherein the first position of the hoist is located above the sand container, and the raw-feeding route comprises the plurality of route segments in the different directions, and
a raw-unloading control unit, configured to control the hoist to move to a position above the hopper along the raw-feeding route, and unload the sand in the sand container into the hopper, wherein during a process of moving the hoist to the position above the hopper along the raw-feeding route, the hoist moves simultaneously along the route segments of the plurality of route segments in the different directions and reaches the position above the hopper, so as to realize the linear movement of the hoist between the first position where the hoist is located and the position where the hopper is located.

3. The sand conveying apparatus according to claim 1, further comprising a controller configured to:
generate a sand transport command, after the sand container is hung on the hoist of the hoisting device;
generate a raw-feeding route between the first position where the hoist is located and the position where the hopper of the conveying device is located in response to the sand transport command, wherein the first position of the hoist is located above the sand container, and the raw-feeding route comprises the plurality of route segments in the different directions; and
control the hoist to move to the position above the hopper along the raw-feeding route, and unloading the sand in the sand container into the hopper, wherein control the hoist to move to the position above the hopper along the raw-feeding route comprises: control the hoist to move simultaneously along the route segments of the plurality of route segments in the different directions and reach the position above the hopper, so as to realize the linear movement of the hoist between the first position of the hoist and a position of the hopper.

4. The sand conveying apparatus according to claim 3, wherein
the coordinate system comprises a first coordinate axis and a second coordinate axis;
each of the plurality of route segments of the raw-feeding route is parallel to the first coordinate axis or the second coordinate axis of the coordinate system, and the first coordinate axis is different from the second coordinate axis, a first track is provided in a direction parallel to the first coordinate axis, and a second track is provided in a direction parallel to the second coordinate axis; and
controlling the hoist to move to the position above the hopper along the raw-feeding route comprises: controlling the hoist to move on the first track and the second track simultaneously.

5. The sand conveying apparatus according to claim 4, wherein
a plurality of first limit sensors are provided on the first track, and a plurality of second limit sensors are provided on the second track;
positions of the first limit sensors located at two ends of the first track are first utmost positions, and positions of the second limit sensors at two ends of the second track are second utmost positions; and
the controller is further configured to:
control the hoist to move on the first track without exceeding the first utmost positions and to move on the second track without exceeding the second utmost positions.

6. The sand conveying apparatus according to claim 5, wherein control the hoist to move on the first track without exceeding the first utmost positions and to move on the second track without exceeding the second utmost positions comprises:

during movement of the hoist, calculate position coordinates of the hoist in the coordinate system according to a moving time of the hoist;

according to trigger signals generated by the plurality of first limit sensors and the plurality of second limit sensors during the movement of the hoist, calibrate the position coordinates of the hoist; and compare the position coordinates of the hoist with the first utmost positions and the second utmost positions respectively, and in a case where the position coordinate of the hoist exceeds the first utmost positions or the second utmost positions, stop an operation of the hoist and activating a protection mechanism.

7. The sand conveying apparatus according to claim 3, wherein after unloading the sand in the sand container into the hopper, the controller is further configured to:

Control the hoist to return to the first position of the hoist along the raw-feeding route, so as to continue a next sand transportation.

8. The sand conveying apparatus according to claim 4, wherein the hoisting device further comprises a sand unloading mechanism, and the hoist comprises a hanger;

the sand unloading mechanism is connected with both the hoist and an end of the sand container away from the hoist, and the hanger is configured to be connected with an end of the sand container close to the hoist; and unload the sand in the sand container into the hopper comprises: automatically unload the sand in the sand container into the hopper through the sand unloading mechanism.

9. The sand conveying apparatus according to claim 8, wherein before the sand container is hung on the hoist, in a case where the hoist is located at a second position different from the first position, a moving route is generated between the first position and the second position of the hoist; and the hoist is controlled to move to the first position along the moving route.

10. The sand conveying apparatus according to claim 8, wherein the coordinate system further comprises a third coordinate axis, and the third coordinate axis is perpendicular to the first coordinate axis and the second coordinate axis;

after the hoist is moved to the first position, the hanger of the hoist is configured to fall along the third coordinate axis to hang the sand container;

after the sand container is hung on the hanger of the hoist, the hanger of the hoist is configured to rise along the third coordinate axis, until the hanger of the hoist rises to a third utmost position in a direction of the third coordinate axis within the moving range of the coordinate system.

11. The sand conveying apparatus according to claim 10, the controller is further configured to:

during the movement of the hoist along the raw-feeding route, detect a tilt angle between the hoist and the third coordinate axis by using a tilt-angle sensor;

in a case where the tilt angle is greater than a warning threshold, send an alarm information; and in a case where the tilt angle is greater than a safety threshold, stop an operation of the hoist.

12. The sand conveying apparatus according to claim 8, wherein the storage device comprises a plurality of storage tanks, each of the plurality of storage tanks corresponds to one demand site in the coordinate system; and the controller is further configured to:

in a case where the demand site needs to be loaded, generate a demand information, wherein the demand information comprises a single demand site or a plurality of demand sites arranged in a sequence;

in response to the demand information and the position of the hopper, generate and output a displacement route of the conveying device; and control the conveying device to move to the single demand site along the displacement route, or move to the plurality of demand sites one by one according to the sequence of the plurality of demand sites.

13. The sand conveying apparatus according to claim 12, the controller is further configured to:

in a case where the conveying device moves to the single demand site, or in a case where the conveying device moves to a last one of the plurality of demand sites, output an arrival information and control the conveying device to stop moving, wherein the conveying device and the hoist do not move simultaneously.

14. The sand conveying apparatus according to claim 13, wherein the conveying device further comprises a belt assembly, after automatically unloading the sand in the sand container into the hopper through the sand unloading mechanism, and the controller is further configured to:

in a case where the conveying device is in a non-moving state, controlling the belt assembly to run, so as to convey the sand in the hopper of the conveying device into the storage tank corresponding to the conveying device, wherein in a case where there is no sand on the belt assembly, a completion information is output.

15. The sand conveying apparatus according to claim 14, wherein before controlling the belt assembly to run so as to convey the sand in the hopper of the conveying device into the storage tank corresponding to the conveying device, the controller is further configured to:

in a case where the conveying device corresponds to the storage tank, output a tank opening information, wherein the tank opening information is used to open a feed inlet of the storage tank;

otherwise, output a closing information, wherein a proximity switch is provided at the feed inlet of the storage tank, and in a case where the conveying device moves to the feed inlet of the storage tank, determine whether the conveying device corresponds to the storage tank according to a proximity signal sent by the proximity switch.

16. The sand conveying apparatus according to claim 15, wherein one of the plurality of storage tanks of the storage device is configured to sends the tank opening information at a time.

17. The sand conveying apparatus according to claim 15, the controller is further configured to:

Control a sand feeding shutter at the feed inlet of the storage tank to open, in response to the tank opening information;

detecting an opening value of the sand feeding shutter by using an opening sensor on the sand feed shutter; and in a case where the opening value is greater than a preset value, control the belt assembly to run.

18. A control method of a sand conveying apparatus, comprising:
   generating a sand transport command, after a sand container of the sand conveying apparatus is hung on a hoist of a hoisting device of the sand conveying apparatus;
   generating a raw-feeding route between a first position where the hoist is located and the position where a hopper of a conveying device of the conveying apparatus is located in response to the sand transport command, wherein the first position of the hoist is located above the sand container, and the raw-feeding route comprises a plurality of route segments; and
   controlling the hoist to move to a position above the hopper along the raw-feeding route, and unloading the sand in the sand container into the hopper, wherein controlling the hoist to move to the position above the hopper along the raw-feeding route comprises: controlling the hoist to move simultaneously along the route segments of the plurality of route segments and reach the position above the hopper, so as to realize a linear movement of the hoist between the first position of the hoist and a location of the hopper,
   wherein a coordinate system is established based on an action range of the hoisting device, and according to a scale information, positions of the hoist and the hopper are marked in the coordinate system and updated in real time, and a moving range of the hoist is set in the coordinate system.

19. A non-transitory computer-readable storage medium, having an executable code stored thereon, wherein in a case where the executable code is executed by a processor, the processor executes a control of a sand conveying apparatus by:
   generating a sand transport command, after a sand container of the sand conveying apparatus is hung on a hoist of a hoisting device of the sand conveying apparatus;
   generating a raw-feeding route between a first position where the hoist is located and the position where a hopper of a conveying device of the conveying apparatus is located in response to the sand transport command, wherein the first position of the hoist is located above the sand container, and the raw-feeding route comprises a plurality of route segments; and
   controlling the hoist to move to a position above the hopper along the raw-feeding route, and unloading the sand in the sand container into the hopper, wherein controlling the hoist to move to the position above the hopper along the raw-feeding route comprises: controlling the hoist to move simultaneously along the route segments of the plurality of route segments and reach the position above the hopper, so as to realize a linear movement of the hoist between the first position of the hoist and a location of the hopper,
   wherein a coordinate system is established based on an action range of the hoisting device, and according to a scale information, positions of the hoist and the hopper are marked in the coordinate system and updated in real time, and a moving range of the hoist is set in the coordinate system.

* * * * *